(12) United States Patent
Freimann et al.

(10) Patent No.: US 8,593,642 B2
(45) Date of Patent: Nov. 26, 2013

(54) METHOD OF MEASURING A SHAPE OF AN OPTICAL SURFACE BASED ON COMPUTATIONALLY COMBINED SURFACE REGION MEASUREMENTS AND INTERFEROMETRIC MEASURING DEVICE

(75) Inventors: Rolf Freimann, Aalen (DE); Bernd Doerband, Aalen (DE); Stefan Schulte, Aalen-Waldhausen (DE); Albrecht Hof, Aalen (DE); Frank Riepenhausen, Oberkochen (DE); Matthias Manger, Aalen-Unterkochen (DE); Dietmar Neugebauer, Aalen (DE); Helmut Issler, Aalen-Ebnat (DE); Armin Bich, Aalen (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 0 days.

(21) Appl. No.: 13/417,487

(22) Filed: Mar. 12, 2012

(65) Prior Publication Data
US 2012/0229814 A1 Sep. 13, 2012

Related U.S. Application Data

(63) Continuation of application No. PCT/EP2009/006754, filed on Sep. 18, 2009.

(51) Int. Cl.
*G01B 11/02* (2006.01)
(52) U.S. Cl.
USPC ............................ 356/512; 356/513; 356/515
(58) Field of Classification Search
USPC .......................................... 356/450–521, 601
See application file for complete search history.

(56) References Cited

U.S. PATENT DOCUMENTS 4,924,086 A * 5/1990 Weber ........................... 250/235
5,757,493 A 5/1998 VanKerkhove
(Continued)

FOREIGN PATENT DOCUMENTS

DE 3205362 A1 8/1983
DE 102 29 816 A1 1/2004
(Continued)

OTHER PUBLICATIONS

"Engineering Optics", Chapter 6, Keigo Iizyuka, 2nd Edition, Spring Science + Business Media, 2008.
(Continued)

*Primary Examiner* — Tarifur Chowdhury
*Assistant Examiner* — Michael P Lapage
(74) *Attorney, Agent, or Firm* — Sughrue Mion, PLLC

(57) ABSTRACT

Measuring a shape of an optical surface (14) of a test object (12) includes: providing an interferometric measuring device (16) generating a measurement wave (18); arranging the measuring device (16) and the test object (12) consecutively at different measurement positions relative to each other, such that different regions (20) of the optical surface (14) are illuminated by the measurement wave (18); measuring positional coordinates of the measuring device (16) at the different measurement positions in relation to the test object (12); obtaining surface region measurements by interferometrically measuring the wavefront of the measurement wave (18) after interaction with the respective region (20) of the optical surface (14) using the measuring device (16) in each of the measurement positions; and determining the actual shape of the optical surface (14) by computationally combining the surface region measurements based on the measured positional coordinates of the measuring device (16) at each of the measurement positions.

13 Claims, 15 Drawing Sheets

(56) References Cited

U.S. PATENT DOCUMENTS

| | | | |
|---|---|---|---|
| 5,960,379 | A * | 9/1999 | Shimizu et al. ............... 702/155 |
| 6,312,373 | B1 | 11/2001 | Ichihara |
| 7,061,626 | B1 | 6/2006 | Schillke et al. |
| 7,218,403 | B2 | 5/2007 | Kuechel |
| 2003/0011784 | A1 | 1/2003 | De Groot et al. |
| 2003/0025915 | A1 | 2/2003 | Freimann et al. |
| 2004/0075842 | A1 * | 4/2004 | Dunn et al. ................... 356/511 |
| 2006/0215175 | A1 * | 9/2006 | Yacoubian .................... 356/502 |
| 2006/0221350 | A1 | 10/2006 | Murphy et al. |
| 2006/0274325 | A1 | 12/2006 | Hetzler et al. |
| 2007/0058269 | A1 | 3/2007 | Mann et al. |
| 2008/0043247 | A1 | 2/2008 | Arnold et al. |
| 2009/0079992 | A1 | 3/2009 | Doerband |
| 2009/0091723 | A1 | 4/2009 | Sasaki |
| 2009/0128829 | A1 | 5/2009 | Schillke et al. |
| 2009/0195788 | A1 * | 8/2009 | Dosaka et al. ................ 356/511 |

FOREIGN PATENT DOCUMENTS

| | | |
|---|---|---|
| EP | 1925907 A1 | 5/2008 |
| GB | 2421302 A | 6/2006 |
| JP | 63-269024 | 11/1988 |
| JP | 02-259509 A | 10/1990 |
| JP | 07-239217 | 9/1995 |
| JP | 08-240417 | 9/1996 |
| JP | 2000-505900 A | 5/2000 |
| JP | 2001066123 A | 3/2001 |
| JP | 2003-050185 A | 2/2003 |
| JP | 2005147715 A | 6/2005 |
| JP | 2007-537426 A | 12/2007 |
| JP | 2008534986 A | 8/2008 |
| JP | 2008-286598 A | 11/2008 |
| JP | 2009-092389 A | 4/2009 |
| WO | 2006077145 A2 | 7/2006 |
| WO | 2006081031 A2 | 8/2006 |
| WO | 2006107985 A2 | 10/2006 |
| WO | 2009007087 A1 | 1/2009 |

OTHER PUBLICATIONS

Freimann, R., et al., "Propagation of the phase distribution through double telecentric optical systems", Optik, Apr. 1997, vol. 105, No. 2, pp. 69-73.

Griesmann U., et al., "Uncertainties in Aspheric Profile Measurements with the Geometry Measuring Machine at NIST", Dowbloaded Feb. 17, 2009, http://www.aps.and.gov/Xray_Science_Division/Optics_Fabrication_and_Metrology/Internal_Only/APEC_%2054244_Lahsen.pdf.

"Metrology Solutions", Homepage of Fisba Optik, downloaded Feb. 17, 2009, http://www.fisba.ch.

"Taking Optical Precision to the Extreme", SPIE Newsroom: SPIE.org, downloaded Feb. 17, 2009, http://spie.org/x19190.xml?highlight=x2400&ArticleID=x16160.

Machretti, L., "Fabrication and metrology of 10X Schwarzschild optics for EUV imaging", Proc. of SPIE vol. 5193 (2004) downloaded Feb. 17, 2009, http://adsabs.harvard.edu/abs/2004SPIE.5193...1M.

"Panasonic UAP3P coordinate measuring machine", downloaded Jun. 25, 2009, http://industrial.panasonic.com/ww/products_e/product_cat2/ADAH000_e/ua3p_kaisetu_e.html.

Henselmans R., et al., "NANOMEFOS", downloaded Jun. 26, 2009, www.mate.tue.nl/mate/pdfs/4162.pdf.

"Metrology Solutions Compatible with Corrective polishing machines", Zeeko Ltd., downloaded Jun. 26, 2009, www.zeeko.co.uk.

Malacara, D., "Optical Shop Testing", chapter 12, 2nd edition, John Wiley & Sons, Inc. 1992.

"Coordinate-measuring machine", Wikipedia.org, downloaded Jul. 8, 2009, http://en.wikipedia.org/wiki/Coordinate-measuring_Machine.

* cited by examiner

METHOD OF MEASURING A SHAPE OF AN OPTICAL SURFACE BASED ON COMPUTATIONALLY COMBINED SURFACE REGION MEASUREMENTS AND INTERFEROMETRIC MEASURING DEVICE

CROSS REFERENCE TO RELATED APPLICATIONS

This is a Continuation of International Application No. PCT/EP2009/006754, with an international filing date of Sep. 18, 2009, which was published under PCT Article 21(2) in English, and the entire contents of which are incorporated herein by reference.

BACKGROUND OF THE INVENTION

The present invention relates to the technical field of manufacturing optical elements and testing of optical elements using a measuring apparatus like, for example, an interferometer. In particular, the present invention relates to a method of measuring a shape of an optical surface of a test object, an interferometric measuring device configured for measuring a shape of an optical surface of a test object, a method of qualifying a wave shaping element having a wave shaping surface and an optical element manufactured using the above method or the above interferometric measuring device.

The optical element can for example be an optical lens or an optical mirror used in an optical system, such as a telescope used in astronomy or a projection optical system used for imaging structures, such as structures disposed on a mask or reticle, onto a radiation sensitive substrate, such as a resist on a wafer, in a microlithographic method. The performance of such an optical system largely depends on the accuracy with which the optical surface can be processed or manufactured to have a target shape determined by a designer of the optical system. In such manufacture it is necessary to compare the shape of the processed optical surface with its target shape, and to determine differences between the processed surface and the target surface. The optical surface may then be further processed at those portions at which differences between the machined and target surfaces exceed for example predefined thresholds.

In a conventional method, an optical test surface, which can be of aspherical shape, is disposed in a beam path of incoming measuring light of an interferometer. The interferometer comprises a wave shaping element, also called compensation system, that shapes the beam of the measuring light such that the measuring light is substantially orthogonally incident on the optical surface at each location thereof. Thus, the wavefront of the measuring light has substantially the same shape as the surface shape of the optical surface, on which the measuring light is orthogonally incident. Compensation systems are also referred to as null-lenses, null-lens systems, K-systems and null-correctors. Background information relating to such compensating systems is available for example from chapter 12 of the text book of Daniel Malacara "Optical Shop Testing", $2^{nd}$ edition, John Wiley & Sons, Inc. 1992.

For testing complex aspheres often computer generated holograms (CGHs) are used as compensation systems. For obtaining a highly precise measurement of the shape of the optical test surface all manufacturing errors of the elements in the cavity of the measuring interferometer have to be known precisely. Alternatively, a calibration asphere can be used for calibrating such errors. Often, however, such a calibration asphere is not available. Sometimes a CGH operated in transmission followed by a mirror is used as a calibration object for calibrating the interferometer. The accuracy of the calibration CGH, however, is not better than the accuracy of the compensation system. It is further necessary, to align the calibration CGH to the mirror, which is another source of errors.

Mid-spatial-frequency deviations of the wave front generated by a compensation system in form of a CGH can be caused e.g. by the electron beam writing process. Single writing fields are shifted relative to each other, such that the CGH-structure deviates from section to section laterally from its target position. Further reasons can be local manufacturing errors of the CGH, e.g. protruding structural parts, modified shoulder angles, foreign particles or other defects.

SUMMARY OF THE INVENTION

It is one object of the invention to provide a measuring method and a measuring device solving the above problems and in particular allowing a more precise measurement of the shape of an optical test surface, in particular of an optical element configured to be used in a projection lithography system using EUV-radiation (extreme ultraviolet radiation having a wavelength of less than 100 nm, in particular 13.5 nm).

According to a first aspect of the invention a method of measuring a shape of an optical surface of a test object is provided. The method comprises: providing an interferometric measuring device generating a measurement wave and arranging the interferometric measuring device and the optical surface consecutively at different measurement positions relative to each other, such that different regions of the optical surface are illuminated by the measurement wave, measuring the positional coordinates of the measuring device at the different measurement positions in relation to the test object. Further, surface region measurements are obtained by interferometrically measuring the wavefront of the measurement wave after interaction with the respective region of the optical surface using the measuring device in each of the measurement positions. The method according to the invention further includes the step of determining the actual shape of the optical surface by computationally combining the surface region measurements based on the measured positional coordinates of the interferometric measuring device at each of the measurement positions. According to an embodiment the shapes of the respective regions of the optical surface are determined from the wavefront of the measurement wave after interaction with respective region, wherein the determined shapes of the different regions constitute the sub-surface measurements.

In other words, according to a first aspect of the invention the shape of the optical surface of the test object is measured using a two-dimensionally measuring interferometric measuring device consecutively measuring different two dimensional regions of the optical surface, which measurements can also be referred to as sub-aperture measurements. The different regions may overlap with their respective neighboring regions, however this is not mandatory.

For each sub-aperture measurement the measuring device and the test object are arranged relative to each other at a different measurement positions. This can be implemented e.g. by shifting the test object and/or the measuring device laterally with respect to the propagation direction of the measurement wave between sub-aperture measurements.

The positional coordinates of the measuring device in relation to the test object are measured for each measurement position. Positional coordinates are coordinates in the three-dimensional space, e.g. cartesian coordinates. Tilt angles are not considered positional coordinates in this context. According to one embodiment the measurement accuracy with which the positional coordinates are measured is better than 0.1 µm.

The shapes determined in the sub-aperture measurements are computationally combined based on the measured positional coordinates of the interferometric measuring device at the measurement positions. This computational combining according to the invention can be referred to as stitching, but differs from conventional stitching.

In conventional stitching interferometric sub-surface results are merely combined by fitting the results in overlapping areas to each other. In conventional stitching, systematic measurement errors of the shapes measured for the single sub-aperture regions can add up from sub-aperture to sub-aperture. In a case, in which the optical surface is divided into e.g. 1000 regions and the shapes of the single regions are each measured with an accuracy of 1 nm, the measurement error may add up to 1 µm over the entire optical surface in case of conventional stitching. Such an error accumulation is prevented according to the invention by considering the measured positional coordinates of the interferometric measuring device with respect to the test object, when computationally combining the sub-aperture measurements. The measured positional coordinates serve as a positional reference grid for the combination of the measured shapes of the sub-aperture measurements. This way long range measurement errors in the measured shape of the optical surface can be avoided.

The computational combination according to the invention allows the optical surface to be divided up into a large number of regions to be measured separately. This way it is possible to use a common measurement wave having the same wave front for all sub-aperture measurements, even if the target shape of the optical surface to be measured is not identical with the wave front of the measurement wave. For example in case the target shape of the optical surface is an asphere or a free form surface, as explained in the following, the measurement wave may be configured with a plane wave front or a spherical wave front. In case of a spherical wave front the wave front may have the shape of the best fitting sphere with respect of the target shape of the optical test surface.

The regions of the optical test surface can be very small. The size of the regions can be chosen such that the deviations of the actual shape of the test surface within the measured regions with respect to the wavefront of the measurement wave are kept small enough for measurement using the interferometric measuring device. Especially the deviations may be kept below one time the wavelength of the light of the measurement wave. This way a complicated wave shaping element, e.g. in the form of a computer generated hologram (CGH) is not required for preshaping the wavefront of the measurement wave.

The method according to the invention allows measurement of the shape of an asphere or a free form surface with largely improved accuracy, especially an accuracy required for use in EUV-lithography. Variations of the actual shape of the optical surface with respect to the target shape having a spatial wavelength above 0.01 mm can be measured with high accuracy.

An asphere in the context of this application refers to a non-spherical shape having rotational symmetry, while the term "free form surface" refers to a non-spherical shape having no rotational symmetry.

In contrast to a distance measurement laser interferometer, which measures the distance to only a single point in space, the interferometric measuring device is an areal interferometer, which measures in each measurement position a two-dimensional region of the optical surface.

In an embodiment according to the invention the tilt angles of the interferometric measurement device with respect to the optical surface of the test object are also considered in the computational combining of the sub-surface measurements. Preferably the tilt of the measurement device is adjusted at each measurement position such that the wavefront of the measurement wave is aligned to the target shape of the test surface in the respective region to be measured. According to one variation the tilt is adjusted such that the rays of the measurement wave impinge on the test surface on average perpendicular or close to perpendicular with respect the target shape.

In some embodiments according to the invention the regions of the optical surface illuminated at the different measurement positions overlap with each other and the sub-surface measurements are computationally combined by fitting the overlapping sections of the sub-surface measurements to each other, and correcting the fitting result based on the measured positional coordinates of the measuring device. According to one variation the measured positional coordinates of the interferometric measuring device are used to determine positional offsets of the sub-surface measurements within the fitting result and the determined positional offsets are corrected in the fitting result.

In certain embodiments according to the invention more than 100, in particular more than 500, e.g. about 1000 different regions of the optical surface are measured.

In some embodiments according to the invention the positional coordinates of the interferometric measuring device in relation to the test object at the measurement positions are measured by directing at least three distance measuring laser interferometers onto at least one retro-reflector attached to the measuring device, wherein the at least three laser interferometers are in a fixed positional relationship to each other during the position measurement. The laser interferometers are preferably arranged in a known position in relation to the test object, e.g. fixed to a holding device for the test object. In some embodiments according to the invention the retro-reflector is in form of a sphere.

The principle of this coordinate measurement is known to the skilled person from global positioning systems (GPS). Reference points defined by the beam origin of the laser interferometers and a measuring point in form of retro-reflector form a tetrahedron. The application of this principle for measuring the positional coordinates of the interferometric measurement device at the different measurement positions allows the determination of the positional coordinates with an accuracy of at least 0.1 µm.

Such an accuracy is unreached conventionally in the positioning of interferometric measurement devices. Positioning devices, like coordinate measuring machines, monitor the positioning using several serially arranged distance measuring interferometers, one for each dimension x, y and z. Here each distance measuring interferometer measures one dimension of the positional coordinate.

The position of the retro-reflector with respect to the interferometric measuring device is known, in particular its position is fixed with respect to measuring device. Distance measuring laser interferometers are laser interferometers configured to measure the distance between the laser interferometer and a single point on a target object. For this purpose the distance laser interferometer emits a laser beam of minimum divergence so that the target object is illuminated point-like. Each laser interferometer measures the distance to the retro-reflector by determining a phase shift between the reflected beam and the outgoing beam, resulting in a single phase shift value. In contrast to wave front measuring interferometers an analysis of a phase distribution transversal to the propagation direction is not performed in distance measuring laser interferometers.

In certain embodiments according to the invention each of the distance measuring laser interferometers is mounted such that it can be tilted with respect to two tilt axes. The tilt axes are preferably arranged lateral to the direction of the respective emitted laser beam. According to an embodiment the distance laser interferometers are part of laser tracers which are configured to perform automatic beam tracking. Hereby the laser beams automatically follow the retro-reflector when the retro-reflector is moved.

In some embodiments according to the invention at least three retro-reflectors are attached to the interferometric measuring device and each measuring laser interferometer is directed at a different retro-reflector. The positional relationship of the three retro-reflectors should be known. In other words each retro-reflector is associated with a respective distance measuring laser interferometer. This allows arrangement of each retro-reflector at the measuring device such that the retro-reflectors face optimally towards their associated laser interferometers. This way the measuring device can be tilted by large angles with the measuring laser interferometers still being able to strike the respective retro-reflector with their laser beams.

In certain embodiments according to the invention the positional coordinates of the interferometric measuring device are determined from the distances measured by the laser interferometers based on the knowledge of the distances between the laser interferometers. The distances between the laser interferometers are measured by a fourth distance measuring laser interferometer that is arranged at a location outside the plane spanned by the three distance laser measuring interferometers, the distances to the at least one retro-reflector is measured by each of the four laser interferometers and the distances between the laser interferometers are determined mathematically therefrom. The distances between the laser interferometers may be measured in a calibration routine. Preferably, several locations within the moving range of the interferometric measuring device are measured during the calibration. Due to over-determination of the measured relative positions the positions of the reference points defined by the laser interferometers relative to each other can be determined in addition to offsets. The calibration routine may be performed according to DE 3205 362 C2, which document is hereby incorporated by reference.

In some embodiments according to the invention the interferometric measuring device is positioned relative to the optical test object using a coordinate measuring machine. A coordinate measuring machine (CMM) is a device used in manufacturing and assembly processes in several industries and is known to the person skilled in the art. A coordinate measuring machine is a positioning apparatus having a typical positioning accuracy in each degree of freedom of 10 μm or better, in particular about 1 μm, especially between 0.5 μm and 10 μm. Due to the knowledge of the position of the measurement device with the accuracy of the coordinate measuring machine it is possible to integrate interferometric measurements over time, so that variations in the refractive index of the surrounding air having a short time constant can be averaged out. Therefore the requirement for conditioning of air in order to keep the index of refraction of air sufficiently constant may be relaxed.

In some embodiments according to the invention a positioning apparatus, e.g. in form of the above mentioned coordinate measuring machine, positions the interferometric measuring device relative to the test object in order to arrange the measuring device in the different measurement positions, which positioning apparatus is configured to tilt the measuring device with respect to at least one axis, especially with respect to two axes. This way the measuring device can be tilted at each measurement position such that the measurement wave strikes the respective region of the test surface essentially perpendicular. This function can be performed using a rotation-tilt joint. As an alternative a cardan joint may be used. The tilt function of the positioning apparatus allows to maintain the test object in the same tilt position during the measurement, therefore gravitation-related deformations of the test object and corresponding corrections to the measurement results can be avoided.

In certain embodiments according to the invention a positioning apparatus positions the interferometric measuring device and the test object relative to each other in order to arrange the measuring device in the different measurement positions, wherein the positioning apparatus is configured to position the measuring device and the test object to each other in at least four axes. For example the positioning apparatus may be configured to position the test object in one axis, such as a rotation axis parallel to the z-axis, and the measuring device in three axes, such as two translation axes x and y and a rotation axis $\theta$. Such a four-axes positioning apparatus would be suitable for the testing of aspheres. According to an embodiment the positioning apparatus is configured to position the measuring device and the test object to each other in five axes. An embodiment of such a five-axes positioning apparatus may be configured to position the test object in two axes, such as two translation axes x and y, and the measuring device in three axes, such as one translation axis z and two rotation axes $\theta$ and $\phi$. Such a five-axes positioning apparatus would be suitable for the testing of free form surfaces.

In some embodiments according to the invention a positioning apparatus positions the interferometric measuring device relative to the test object, in order to arrange the measuring device in the different measurement positions, and further properties of the optical surface are measured by a further measurement device, which is also positioned relative to the test object by the positioning apparatus. The measurement of further properties may be conducted before or after the shape measurement. The further measurement device may be mounted to the positioning apparatus in addition to the first measuring device. In this case the positioning apparatus has two measurement arms. Alternatively the first positioning apparatus may be replaced by the further positioning apparatus in order to measure the further properties. An example of such a further measurement device is a roughness sensor, e.g. an AFM-measurement head for measuring the surface roughness of the optical surface typically in small areas of 1 μm×1 μm or 10 μm×10 μm. In a further alternative embodiment combined measurement devices which can perform several measurement functions simultaneously are used.

In some embodiments according to the invention the interferometric measuring device comprises a detection apparatus configured to record an interferogram and imaging optics comprising at least one curved mirror and being configured to image the optical test surface onto the detection apparatus. The use of imaging optics comprising at least one curved mirror in the interferometric measuring device allows a robust shape measurement as described in more detail below.

According to a second aspect of the invention an interferometric measuring device configured for measuring a shape of an optical surface of a test object is provided. The interferometric measuring device comprises a detection apparatus configured to record an interferogram, and imaging optics comprising at least one curved mirror and being configured to image the optical surface onto the detection apparatus.

According to an embodiment of the invention the imaging optics are made up exclusively from mirror elements. The use of imaging optics comprising at least one curved mirror to image the optical surface onto the detection apparatus allows an optical design in which imaging errors are minimized. By use of at least one curved mirror it becomes possible to design the imaging optics with very few optical components, which can be manufactured with good roughness and shape properties. Further the use of at least one curved mirror allow the imaging optics to be designed such that the individual optical elements of the imaging optics can be arranged in a very stable configuration to each other, such the imaging optics are alignment insensitive to a large extent.

In some embodiments according to the invention the interferometric measuring device is configured to subsequently measure different regions of the optical surface and further comprises an evaluation apparatus configured to determine the shape of the entire optical surface by computationally combining the measurements of the single regions. Regarding various embodiments of computationally combining the measurements of the single regions reference is made to the above description with regard to the first aspect of the invention.

In certain embodiments according to the invention the imaging optics comprise two wavefront forming surfaces, which are configured such that the optical path utilized for imaging the optical surface onto the detection apparatus comprises a focus point located between the two wavefront forming surfaces. The two wavefront forming surfaces may be two different sections of a single mirror or may be located on two separate mirrors.

In some embodiments according to the invention the imaging optics contain at least one non-plane mirror, especially at least one parabolic mirror. Alternatively the at least one non-plane mirror may be a spherical mirror.

In certain embodiments according to the invention the imaging optics are configured such that the optical path utilized for imaging the optical surface onto the detection apparatus strikes the curved mirror, especially the parabolic mirror, twice. According to one embodiment the mirror is utilized symmetrically which has a coma-compensating effect, as explained in more detail later.

In certain embodiments according to the invention the imaging optics further comprise a plane mirror, which is mounted rotatably. This way the plane mirror can be rotated during the interferometric measurement in order to average unevenness effects of the plane mirror. That means effects on the interferometric measurement due to deviations of the shape of the mirror from the plane shape can be averaged out by rotating the mirror. Especially medium to high-frequency shape deviations of the plane mirror can be averaged. According to a preferred embodiment the plane mirror is arranged in the optical path of the imaging optics such that the light reflected from the curved mirror is reflected back to the curved mirror to strike the curved mirror a second time.

In some embodiments according to the invention the imaging optics are configured to image the optical surface onto the detection apparatus with a 1:1 imaging ratio, i.e., without magnification. According to a further embodiment the imaging optics comprise two mirrors arranged opposite to each other. In one variation of this embodiment the focal length ratio, and therefore also the imaging ratio, of the two mirrors is 1:2.

In certain embodiments according to the invention the imaging optics comprise two mirrors arranged on the same side of the focus point, but are tilted relative to each other.

In some embodiments according to the invention the imaging optics comprise two mirrors of different focal lengths, wherein the second mirror is arranged in the region of a central portion of the first mirror, such that a central portion of the first mirror is blocked by the second mirror with respect of a wave propagating along the optical axis of the first mirror.

According to a third aspect of the invention a method of qualifying a wave shaping element having a wave shaping surface configured for adapting the wave front of a test wave to a target shape of an optical test surface is provided. According to the qualification method different regions of the wave shaping surface are consecutively irradiated by the measurement wave. For each irradiated region the wavefront of the measurement wave is measured after its interaction with the respective region of the wave shaping surface. Further, the measured wavefronts are computationally combined, the combined wavefront is analyzed and thereby deviations of the wave shaping effect of the wave shaping surface from a target wave shaping effect are determined.

In other words, according to the third aspect of the invention a wave shaping element, e.g. comprising a computer generated hologram (CGH) is qualified regarding its effect on the wavefront of an incoming wave. Such a wave shaping element is typically used by an interferometric measuring apparatus in order to adapt the wave front of a test wave to a target shape of an optical test surface to be measured regarding its deviations from the target shape. The target shape of the optical test surface can e.g. be an aspherical shape, which requires a long range modification of the wavefront of the test wave. The wave shaping element has a wave shaping effect which in practice varies from a target wave shaping effect. The deviation of the actual wave shaping effect from the target wave shaping effect is to be qualified in the qualification method.

According to the qualification method the wave shaping element is irradiated by a measurement wave in regions, and for each region the wavefront of the measurement wave after interaction with the wave shaping element is determined, e.g. using an interferometer. This region-by-region measurement can also be referred to as sub-aperture measurement. Due to the measurement in regions the diameter of the measurement field can be kept so small, that a wave front detection is possible without compensation of the long range wave front forming effects of the wave shaping element. In case of an aspherical target wave shaping effect the asphericity does not have to be corrected for the qualification measurement due to the small sub-apertures.

In order to obtain mid-spatial-frequency deviations a fitting of long range deviations is performed with respect to the measurement result and the fitting result is subtracted. Subsequently the wavefronts measured for the different regions, which are each two-dimensional wavefront distributions are computationally combined. This can be done e.g. by fitting sections of the wavefront distributions corresponding to overlapping sections of the associated regions to each other, which is also referred to as stitching. The combined wavefront is subsequently used to determine deviations of the wave shaping effect of the wave shaping surface, advantageously of the entire wave shaping surface, from a target wave shaping effect.

Effectively, the wave shaping element is qualified in regions and the measurement results are combined. Dividing up the wave shaping surface of the wave shaping element into single regions for the qualification measurement allows to achieve a higher accuracy of measurement for each region compared to the accuracy achievable when measuring the entire wave shaping surface in one single measurement. Therefore the inventive concept of dividing the measurement up in regions and then combining the measurements allows the wave shaping element to be qualified with respect to the deviations of its wave shaping effect from a target wave shaping effect at an improved accuracy.

Especially the qualification method according to the invention allows absolute qualification of mid-spatial-frequency deviations of the wave front forming effect of a CGH from its target effect. "Absolute" in this context means that the measuring result is specified without reference to a reference surface. "Mid-spatial-frequency" in this context refers to spatial frequencies above the frequencies covered by the classical Zernike polynomials Z1 to Z36, which are known to the skilled person.

The qualification method according to the invention allows the absolute qualification of deviations in the spatial frequency range corresponding to spatial periods between 0.01 mm and 2 mm, which is less than one hundredth of the diameter of a typical CGH having a diameter on the order of 200 mm. Further, low spatial frequency deviations having a spatial wavelength in the range between one hundredth to one time the diameter of the CGH can be measured by the qualification method according to the invention. The lower limit for the spatial frequency is given by the local structural period of a CGH, which is typically in the range between 1 μm and 10 μm. Further, the qualification method allows the separation of mid-spatial-frequency structural deviations of the CGH from so-called "rigorous effects", which are deviations from the scalar diffraction behavior.

As already indicated above, according to an embodiment the regions of the wave shaping surface irradiated consecutively are overlapping with each other and the computational combining of the measured wavefronts is performed by fitting the overlapping sections of the measured wavefronts to each other. As mentioned above, the wave shaping element to be qualified may comprise a diffractive element, such as a CGH. Alternatively the wave shaping element may also be a lens, an asphere of a free form surface.

In some embodiments according to the invention the measurement wave passes through magnifying imaging optics after its interaction with the respective region of the wave shaping surface. The magnifying imaging optics allow the measurement of mid-spatial-frequency wave front components which could not be captured by a wave front detector in case of non-magnifying imaging. The magnifying imaging optics image the mid-spatial-frequency wave front components with a respectively smaller local frequency, such that they can be captured by the wave front detector used for measuring the wavefront. The imaging scale of the magnifying imaging optics may be adapted to the spatial frequency regions of interest. Measurements at different spatial frequency regions may be combined with each other in order to cover a larger spatial frequency range.

According to one embodiment the magnifying imaging optics are rotated between measurements and the variable wave front components of the measurements are attributed to the imaging optics. This way the errors introduced by the imaging optics can be eliminated from the measurement result.

According to some embodiments the magnifying imaging optics are configured as 4f-imaging optics in order to conserve the wave front in the imaging. According to a variant suitable to be employed here the 4f-imaging optics contain two lenses having different focal lengths.

In certain embodiments according to the invention the wavefront measurement is conducted by a measurement apparatus comprising illumination optics for directing the measurement wave onto the wave shaping element and detection optics for measuring the wavefront of the measurement wave after its interaction with the wave shaping surface. According to an embodiment the illumination optics and the detection optics are connected rigidly to each other. The different regions of the wave shaping surface are consecutively irradiated by the measurement wave by shifting the measurement apparatus and the wave shaping element relative to each other between irradiation of the different regions. Thereby the wave shaping element and/or the measurement apparatus can be shifted. Alternatively or in addition, the wave shaping element may be rotated between the measurements.

In certain embodiments according to the invention the measurement apparatus is held by a coordinate measuring machine and positioned by the same relative to the wave shaping element. A coordinate measuring machine is discussed several times in this application, which can be referred to for more detail.

In some embodiments according to the invention the wave shaping surface contains a diffractive structure and the wavefront of the measurement wave is measured after its diffraction at the diffractive structure in the respective wave shaping regions in a positive diffraction order and a negative diffraction order. According to a variation the positive diffraction order and the negative diffraction order are of the same absolute value, but of different sign, e.g. +1. and −1. diffraction order. Alternatively, diffraction orders of different absolute value and opposite signs may be used. In order to generate the positive and the negative diffraction order the wave shaping element may be measured twice, wherein the wave shaping element is rotated by 180 degrees between the measurements.

In certain embodiments according to the invention the wavefronts measured for the positive diffraction order and the negative diffraction order are subtracted from each other. The result of the subtraction contains all mid-spatial-frequency deviations of the diffractive structure, which reverse their sign with the sign of the diffraction order. Mid-spatial-frequency deviations, which maintain their sign with the sign of the diffraction order, cancel out in the subtraction.

Additionally or alternatively the wavefronts measured for the positive diffraction order and the negative diffraction order may be summed up. In this case the mid-spatial-frequency deviations, maintaining their sign with the a change of sign of the diffraction order remain in the sum, while deviations changing their sign cancel out. The measurement of the wavefronts under different signs of the diffraction order is particularly useful in case of a carrier frequency-CGH. Such a carrier frequency-CGH is known in the art and may be formed by diffraction elements of two different types positioned alternatingly next to each other with a high line density.

According to further embodiments the measurements are conducted at different wavelengths of the measurement wave and the results are analyzed in order to separate out wavelength dependent deviations. Especially rigorous effects display a considerable wavelength dependence. A comparison of the rigorous effects measured at the different wavelengths allows a very precise analysis of the rigorous effects.

Further, a measuring apparatus configured to perform the measurement method according to the first aspect of the invention and a qualification apparatus configured to perform the qualification method according to the third aspect of the invention is provided according to the present invention. The features contained in the above described embodiments of the respective method according to the invention can be transferred to the respective apparatus according to the invention and vice versa. The embodiments of the apparatus resulting therefrom shall therefore explicitly be covered by the disclosure of this invention.

Further, according to a fourth aspect of the present invention an optical element is provided, which optical element has an optical surface, which is adapted to a non-spherical target shape, such that variations of the actual shape of the optical surface with respect to the target shape having a spatial wavelength between 0.015 mm and 2 mm are limited to at most 100 pm RMS (root mean square). The RMS-value is, as familiar to the skilled person, calculated from a number of local amplitudes $A_l$ on the optical surface.

Such an optical element can for example be manufactured using the measuring method according to the first aspect of the present invention and/or an interferometric measuring device according to the second aspect of the present invention. Further the above optical element can be manufactured using the interferometric measuring apparatus comprising a wave shaping element, which has been qualified using the qualification method according to the third aspect of the present invention. The deviations of the wave shaping effect of the wave shaping surface from the target wave shaping effect determined by the qualification method are taken into consideration when interferometrically measuring the shape of the optical element using the interferometric measuring apparatus.

Using the measurement method according to the first aspect of the invention, the interferometric measuring apparatus according to the second aspect of the invention and/or a measurement apparatus employing a wave shaping element qualified by the qualification method according to the third aspect of the invention allows the deviations of the actual shape of the optical surface of an optical element to be measured with respect to the non-spherical target shape with such an accuracy that the optical surface can be machined subsequently such that the above mentioned tolerances can be met. Currently available optical elements do not meet these specifications.

In some embodiments according to the invention the optical surface of the optical element is adapted to the non-spherical target shape, such that variations of the actual shape of the optical surface with respect to the target shape having a spatial wavelength between 0.015 mm and 30 mm are limited to at most 100 pm RMS, in particular to at most 50 pm RMS or at most 10 pm RMS. The variations having a spatial wavelength between 0.015 mm and 30 mm are also referred to as mid-spatial-frequency variations.

In one embodiment of the optical element according to the invention the target shape of the optical surface is a free form surface having no rotational symmetry and the target shape has a deviation from its best fitting spherical surface of at least 5 µm, in particular of at least 20 µm. That means the target shape deviates from its best fitting spherical surface at at least one location of the target shape by at least 5 µm or at least 20 µm, respectively. According to a variation of the invention the target shape has a deviation from its best fitting sphere of at least 5 µm and at most 10 mm, in particular at most 1 mm.

In an alternative embodiment of the optical element according to the invention the target shape of the optical surface is a rotationally symmetric aspherical surface and the target shape has a deviation from its best fitting spherical surface of at least 500 µm, in particular at least 2.5 mm. Therefore, the target shape deviates from its best fitting spherical surface at at least one location of the target shape by at least 500 µm or at least 2.5 mm, respectively.

In a further embodiment of the optical element according to the invention the target shape of the optical surface is configured as an off-centered section of a rotationally symmetric aspherical surface and the target shape has a deviation from its best fitting spherical surface of at least 500 µm. Such an off-centered section of a rotationally symmetric aspherical surface can also be referred to as "off-axis asphere". In one embodiment the off-centered section does not comprise the apex of the rotationally symmetric aspherical surface.

According to a further embodiment the optical element is manufactured to a tolerance sufficient for microlithographic application, in particular to a tolerance sufficient for microlithographic application using extreme ultraviolet radiation (EUV). The optical element having the mentioned tolerances can be used for example in the projection optics of an exposure tool for microlithography. Tolerances of the optical element can for example be taken from US 2007/0058269 A1, which document is hereby incorporated by reference.

In some embodiments according to the present invention the optical element is configured as a transmission lens, in other embodiments as a mirror. In case of configuration as a mirror the optical element can be used in a EUV-projection exposure tool for microlithography.

BRIEF DESCRIPTION OF THE DRAWINGS

The foregoing, as well as other advantageous features of the invention, will be more apparent from the following detailed description of exemplary embodiments of the invention with reference to the following diagrammatic drawings, wherein.

DETAILED DESCRIPTION OF EXEMPLARY EMBODIMENTS

Figure 1:
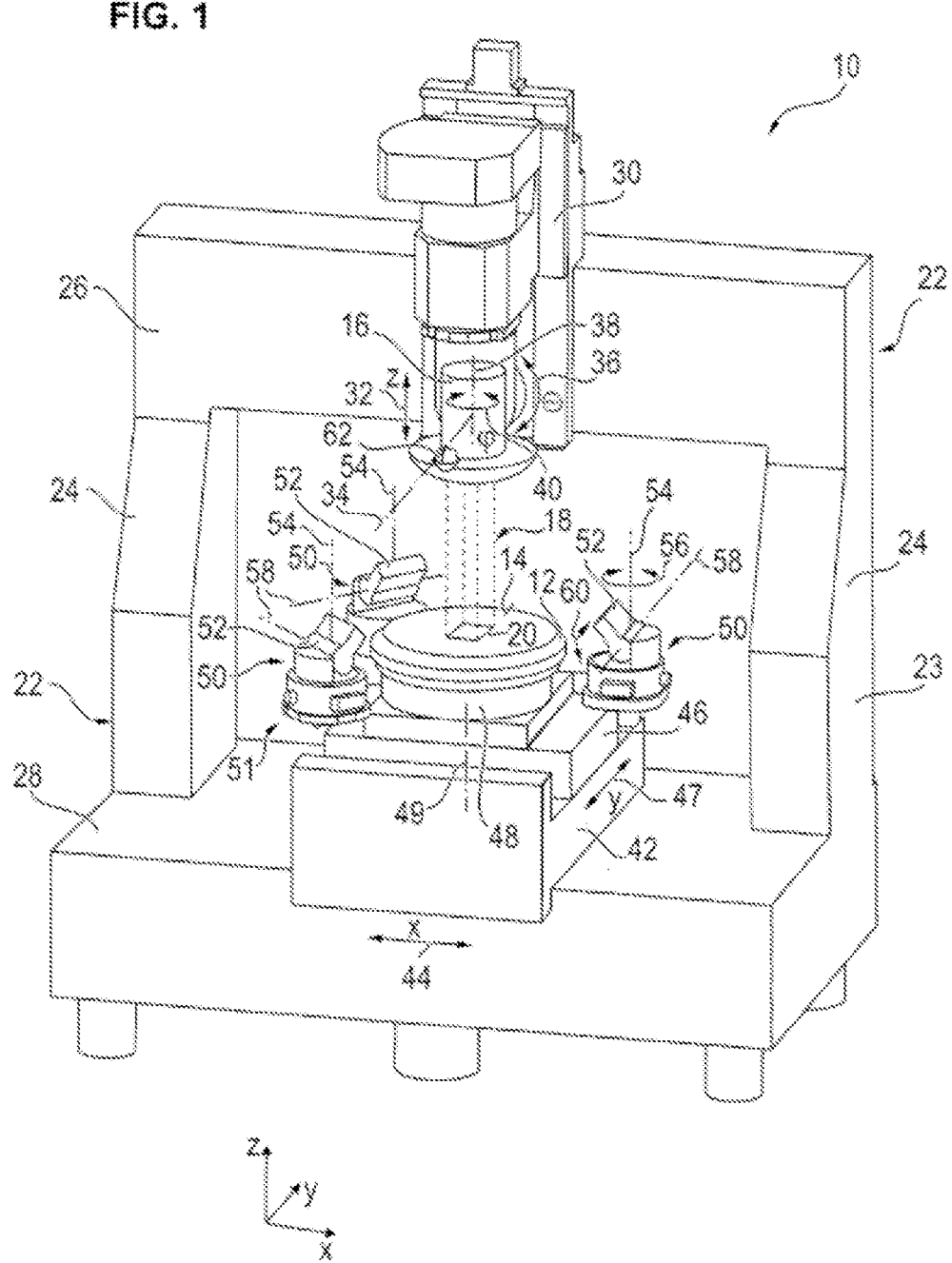
FIG. 1 illustrates an embodiment of a measuring apparatus for measuring a shape of an optical surface including an interferometric measuring device.

In the embodiments of the invention described below, components that are alike in function and structure are designated as far as possible by the same or alike reference numerals. Therefore, to understand the features of the individual components of a specific embodiment, the descriptions of other embodiments or the summary of the invention should be referred to.

FIG. 1 schematically illustrates a measuring apparatus 10 for measuring a shape of an optical surface 14 of a test object 12. The test object 12 can, for example, be a mirror or a transmissive optical lens, etc. The measuring apparatus 10 comprises a positioning apparatus 22, an interferometric measuring device 16 and an object holder 48. The positioning apparatus 22 is configured for positioning the interferometric measuring device 16, configured as a measuring head, and the test object 12 held by the object holder 48 relative to each other.

The interferometric measuring device 16 generates a measurement wave 18 directed at the optical surface 14 of the test object 12. The interferometric measuring device 16 may be configured according to several embodiments described in more detail below with respect to FIGS. 5 to 9.

The measuring apparatus 10 is configured for measuring deviations of the optical surface 14 from its target shape, wherein the target shape can be an aspherical surface or a so-called free form surface. In case of an aspherical surface in the context of this application the target shape is non-spherical, but is generally symmetric with respect to an axis of symmetry. According to an embodiment the target shape of the aspherical surface has a deviation from its best fitting spherical surface of at least 500 µm.

An asphere may be a so-called on-axis asphere, in which case the axial surface 14 under test includes the apex of the rotationally symmetric aspherical surface. Alternatively the optical surface 14 under test may also be a so-called "off-axis asphere", in which case an off-center section, not including the apex is under test. In case of a free form surface the target shape of the optical surface 14 has no rotational symmetry. According to an embodiment of a free form surface the target shape has a deviation from its best fitting spherical surface of at least 5 µm, according to another embodiment at least 20 µm.

The positioning apparatus 22 is configured to position the measuring device 16 and the test object 14 to each other in five axes as detailed in the following and is therefore suitable for testing both aspheres and free form surfaces. The five axes of the positioning apparatus 22 include three translation axes and two tilt axes. In the embodiment shown in FIG. 1 the object holder 48 can be moved both in the x- and y-directions according to the coordinate system shown in FIG. 1 and the interferometric measuring device 16 can be moved in the z-direction and tilted with respect to two tilt axes as explained in the following. The positioning apparatus 22 can be configured as a so called coordinate measuring machine explained in more detail in this application.

The positioning apparatus 22 comprises a frame 23, which is formed by a base plate 28, two vertical bars 24 and a cross bar 26 connecting the vertical bars 24. The positioning apparatus 22 further comprises a movement mechanism for moving the object holder 48 in the x-direction and the y-direction. The movement mechanism is configured by a first slide 42 which can be moved in the x-direction on the base plate 28, as indicated by the double arrow 44, and a second slide 46, movable in the y-direction on top of the first slide 42, as indicated by double arrow 47.

The positioning apparatus 22 further comprises a measuring head positioning device 30, which is configured to allow the measuring head in form of the interferometric measuring device 16 to be moved in vertical direction, i.e., in direction of the z-axis, as indicated by a double arrow 32. Further, the measuring head positioning device 30 is configured to rotate the measuring head with respect to a rotation axis 34, which rotation axis 34 is arranged in the x-y-plane and therefore laterally to the z-axis. The rotational movement Φ with respect to the rotation axis 34 is indicated in FIG. 1 by a double arrow 36.

The mechanics of the measuring head positioning device 30 further allow a rotation of the rotation axis 34 with respect to a second rotation axis 38, which is parallel to the z-axis. This rotational movement φ with respect to the rotation axis 38 is indicated by a double arrow 40. The mechanism in the measuring head positioning device 30 is configured such that the entire rotation mechanism for rotating the measuring device 16 around the rotation axis 34 can be rotated around the rotation axis 38. Therefore, the rotation axis 34 can be arranged in any rotational position within the x-y-plane.

In operation of the measuring apparatus 10 different overlapping regions 20 of the optical surface 14 are illuminated consecutively by the measurement wave 18. For each region 20 of the optical surface 14 to be illuminated the interferometric measuring device 16 is tilted such that the measurement wave 18 strikes the optical surface 14 at the illuminated region 20 at essentially normal incidence. As the shape of the optical surface 14 differs within the illuminated region 20 from the shape of the measurement wave, the measurement wave 18 does not strike the illuminated region at each location perfectly in normal incidence. The tilt of the measurement wave 18 can be adjusted such that the measurement wave 18 strikes optical surface 14 in the center of the illuminated region 20 at a 90°-angle. Alternatively the tilt of the measurement wave 18 can be adjusted such that the average angle of incidence on the illuminated region 20 is 90°.

In case the optical surface 14 has the shape of an asphere and even more in case it has the shape of a free form surface the average normal of the optical surface 14 differs from region to region. The tilting mechanism of the measuring head positioning device 30 allows all those angles to be aligned in order to adjust the angle of the incoming measurement wave 18 accordingly.

In the course of the measurement of the optical surface 14 the object holder 48 is moved in the x-y-plane and the measuring device 16 is tilted accordingly such that consecutively region 20 after region 20 of the optical surface 14 is illuminated by the measurement wave 18. The respective tilt-setting is calculated from the given target shape of the optical surface 14 at the respective region 20 to be measured. The regions 20 are chosen to cover an area of interest of the optical surface 14, in particular the entire optical surface 14, wherein the regions 20 are overlapping with their respective neighbouring regions 20.

The tilting mechanism for the measuring device 16 allows the test object 12 to remain in the same tilt position during the entire shape measurement process. This tilt position preferably corresponds to the tilt position of the object 12 when mounted in a projection exposure system for microlithography. This is important, as a change in the tilt position can alter the optical characteristics of the object 12 to an extent significant to the operation in the projection exposure system.

Figure 3:
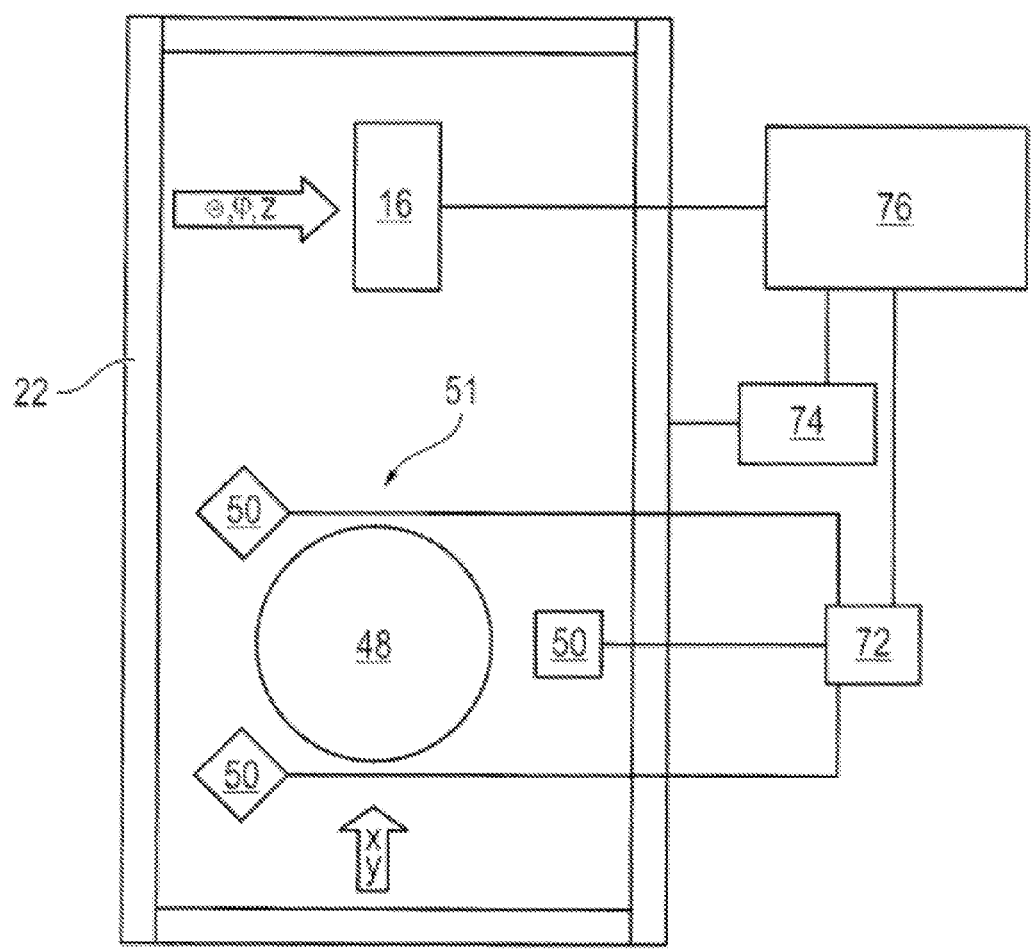
FIG. 3 schematically illustrates the signal processing architecture in the measuring apparatus according to FIG. 1.

At each measurement step, at which a specific region 20 of the optical surface 14 is illuminated by the measurement wave 18 and the shape of the region 20 is measured by the interferometric measuring device 16, the tilt position of the interferometric measuring device 16 and the positional relationship between the measuring device 16 and the test object 12 are recorded by an evaluation device 76 shown in FIG. 3. The tilt position of the measuring device 16 is thereby obtained from the tilt-setting of the positioning apparatus 22 used for the respective measurement position.

The positional relationship between the measuring device 16 and the test object 12 at the respective measurement position is determined by measuring the positional coordinates of the measuring device 16 in relation to the test object 12 using a position measurement system 51 provided with three laser tracers 50. The three laser tracers 50 are fixed to the object holder 48 at different positions around the object holder 48. Each laser tracer 50 is made up of a distance measuring laser interferometer 52 and a tilt mechanism configured to tilt the laser interferometer 52 with respect to a first vertical tilt axis 54, which tilt movement is indicated by the double arrow 56 and a second tilt axis 58 lateral to the first tilt axis 54, which tilt movement is indicated by a double arrow 60.

At each measurement position of the interferometric measuring device 16 the three distance measuring laser interferometers 52 measure the distance to a retro-reflector 62 fixed to the measuring device 16. In the embodiment illustrated in FIG. 1 the retro-reflector 62 is configured in form of a sphere. Depending on the range of angles to be assumed by the measuring device 16, several retro-reflectors 62 may be arranged at the measuring device 16, e.g. one retro-reflector 62 for each laser tracer 50. Each distance measuring laser interferometer 52 emits a laser beam of minimum divergence, so that the retro-reflector 62 is illuminated point like. The distance between the respective laser interferometer 52 and the retro-reflector 62 is determined from a phase shift between the emitted laser beam and the beam reflected back from the retro-reflector 62.

Figure 2:
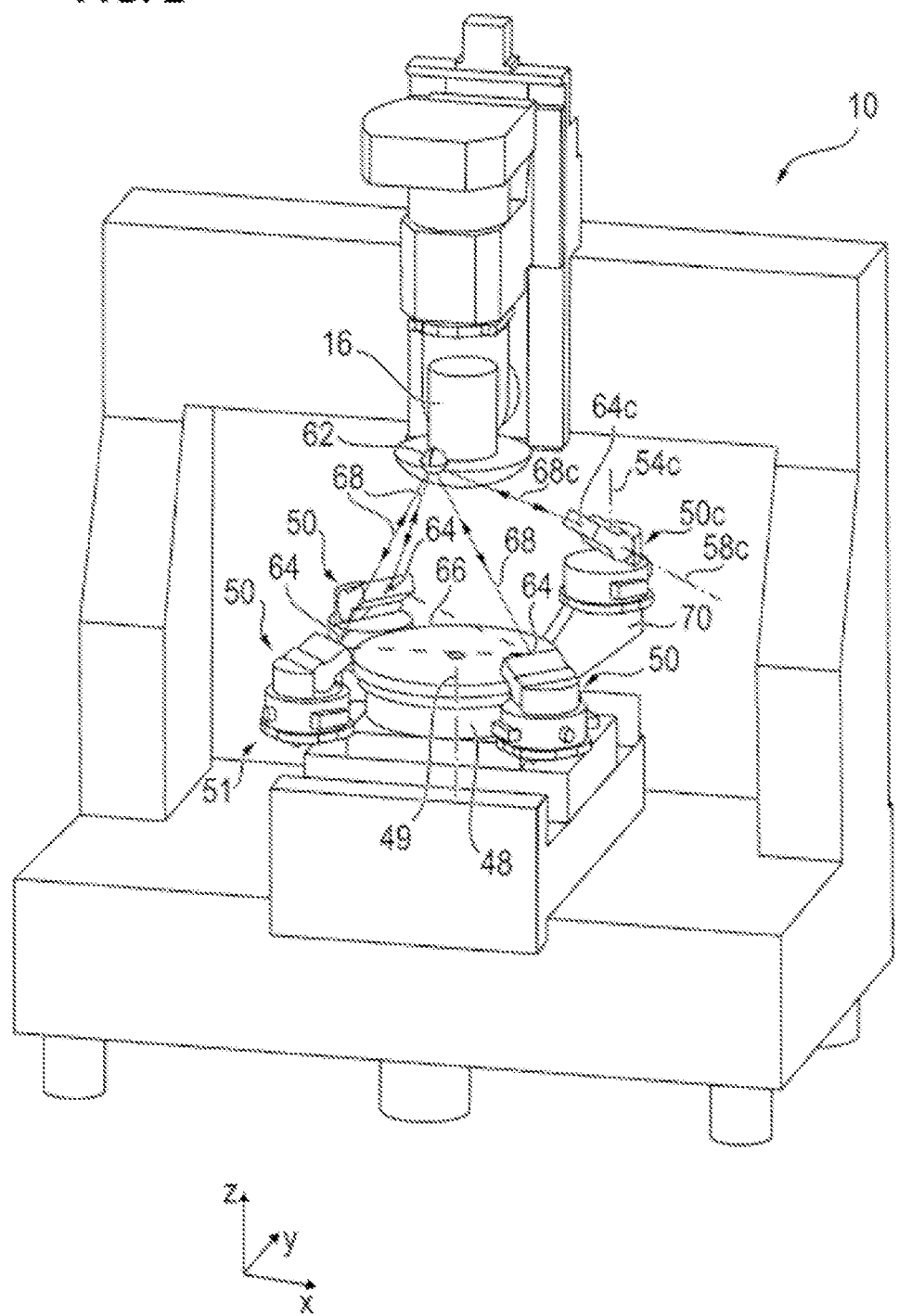
FIG. 2 illustrates the measuring apparatus according to FIG. 1 in a calibration configuration.

The laser emission point 64 of each laser interferometer 52, illustrated in FIG. 2, defines a reference point. The associated reference points 64 of the three laser interferometers 52 and a measuring point defined by the retro-reflector 62 form a tetrahedron. The distances between the reference points are known, e.g. from a calibration procedure described below.

The measured distances between the reference points and the measuring point allows the positional coordinates of the measuring point to be determined with respect to the reference points. The principle of this measurement is also used for GPS (Global Positioning-Systems) and is known, for example from DE 3205362 C2. The use of this principle allows the positional coordinates of the measuring device 16 to be measured at each measurement position of the measuring device 16.

FIG. 2 shows the measuring apparatus 10 with a further laser tracer 50c arranged at the object holder 48 used for calibrating the position measurement system 51. The laser tracer 50c used for calibration is held by a projection arm 70 such that its laser emission point 64c is located outside the plane 66 spanned by the laser emission points 64 of the three laser tracers 50. In the calibration routine the distances to the retro-reflector 62 are measured by each of the laser tracers 50 and the additional laser tracer 50c.

FIG. 2 illustrates the laser beams 68 and 68c of the laser tracers 50 and 50c aimed at the retro-reflector 62. During the calibration routine the positions of several locations within the moving range of the interferometric measuring device 16 are measured by the four laser tracers 50 and 50c. Due to over-determination of the measured relative positions, the relative positions of the three laser emission points 64 are determined, as for example described in DE 3205362 C2.

This way the distances between the above mentioned reference points in form of the laser emission points 64 are known and can be used as basis of the above described measurement of the positional coordinates of the retro-reflector 62 during operation of the measuring apparatus 10. Optionally the object holder 48 may be rotatable with respect to a vertical rotation axis 49, as indicated in FIG. 2.

FIG. 3 is a schematic diagram illustrating the signal processing during operation of the measuring apparatus 10 according to FIG. 1. The interferometric measuring device 16 and the object holder 48 are consecutively arranged at different measurement positions relative to each other, such that at each measurement position a different region 20 of the optical surface 14 held by the object holder 48 is illuminated by the measurement wave 18. As already described above, the object holder 48 is thereby adjusted adequately by the positioning apparatus 22 in two tilt degrees of freedom $\theta$ and $\phi$ and one transitional degree of freedom z.

Further, the object holder 48 is positioned by the positioning apparatus 22 in x and y. In each measuring position the wave front of the measurement wave 18 after interaction with the respective region 22 of the optical surface 14 is interferometrically determined by the measuring device 16. From the determined wavefronts the shapes of the respective regions 20 of the optical surface 40 are determined and forwarded to an evaluation device 76.

At each measurement position the positional coordinates (x, y, z) of the measuring device 16 in relation to the object holder 48 is determined by a processor 72. The processor 72 determines these positional coordinates from the distances measured by the laser tracers 50 as explained above and forwards the positional coordinates to the evaluation device 76. The positioning of the measuring device 16 and the object holder 48 is controlled by a controller 74, which forwards the respective position setting, including tilt and position coordinates to be assumed by the measuring device 16 and the object holder 48, to the positioning apparatus 22.

The controller 74 forwards the position setting at each measurement position to the evaluation device 76 as well. The evaluation device 76 combines the shapes of the different regions 20 determined by the measuring device 16 based on the measured positional coordinates supplied by the processor 72 and the position settings forwarded by the controller 74 for each measurement position.

The interferometric measurements performed at the different overlapping regions 20 of the optical surface 14 can also be referred to as sub-aperture measurements. The computational combining of the sub-aperture measurements based on the measured positional coordinates can be performed accordingly by fitting the overlapping sections of the sub-aperture measurements to each other, put more precisely by fitting the measured shapes associated to the different regions 20 to each other, and correcting the fitting result based on the measured positional coordinates of the measuring device 16.

The fitting of the overlapping sections to each other may also be referred to as stitching. Stitching is known to the skilled person with respect of fitting overlapping sections to each other, however without considering the measured positional coordinates, as proposed by the present invention.

Typically the optical surface 14 is divided in about one thousand regions 20 measured separately and computationally combined afterwards as described above.

Figure 4:
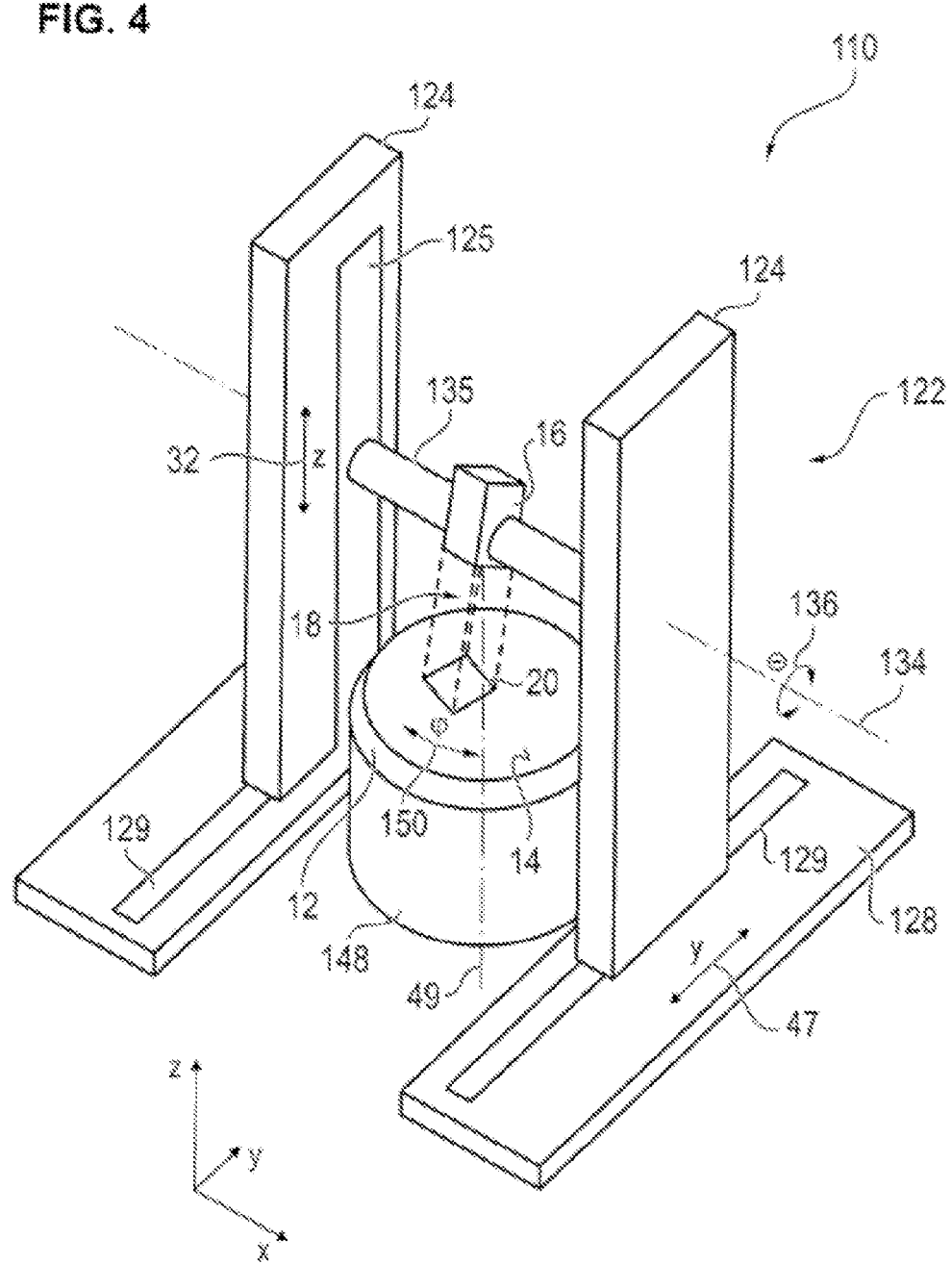
FIG. 4 illustrates a further embodiment of a measuring apparatus for measuring a shape of an optical surface also including an interferometric measuring device.

FIG. 4 illustrates regions of a further embodiment 110 of a measuring apparatus for measuring a shape of an optical surface. The measuring apparatus 110 differs from the measuring apparatus 10 shown in FIG. 1 only in the construction of the positioning apparatus 22, which is designated by the reference numeral 122 according to FIG. 4. In order to highlight the differences between the positioning apparatuses, elements already illustrated in FIG. 1, like the laser tracers 50, are not shown in FIG. 4. Also the positioning apparatus 122 can be configured as a coordinate measuring machine.

The measuring apparatus 110 comprises the interferometric measuring device 16, an object holder 148 and the positioning apparatus 122. The positioning apparatus 122 is configured to rotate the object holder 148 with respect to the rotation axis 49 parallel to the vertical z-axis, as indicated by the double arrow 150. Further, the interferometric measuring device 16 can be moved in the y-direction, as indicated by the double arrow 47 and the z-direction, as indicated by the double arrow 32. Further, the positioning apparatus 122 is configured to perform a θ-tilt of the measuring apparatus 16 with respect to a rotational axis 134, which is parallel to the x-axis. The tilt movement is indicated by the double arrow 136.

The positioning apparatus 122 is therefore a four-axes positioning apparatus, three axes for positioning the interferometric measuring device in the three-dimensional space and one axis for rotation of the object holder 148. The positioning apparatus 122 comprises two base plates 128 having horizontal guide tracks 129. In the horizontal guide tracks 129 two vertical bars 124 are slideable in the y-direction. The vertical bars 124 in turn comprise each a vertical guide track 125 in which a shaft 135 is slideable in the z-direction. The shaft 135 is rotatable around the rotational axis 134.

FIGS. 5 to 8 illustrate different embodiments according to the invention of the measuring device 16 shown in FIGS. 1 to 4. As mentioned above, the inter-ferometric measuring device 16 is configured to generate a measurement wave 18 for illuminating a region 20 of the optical surface 14 of the test object 12.

Figure 5:
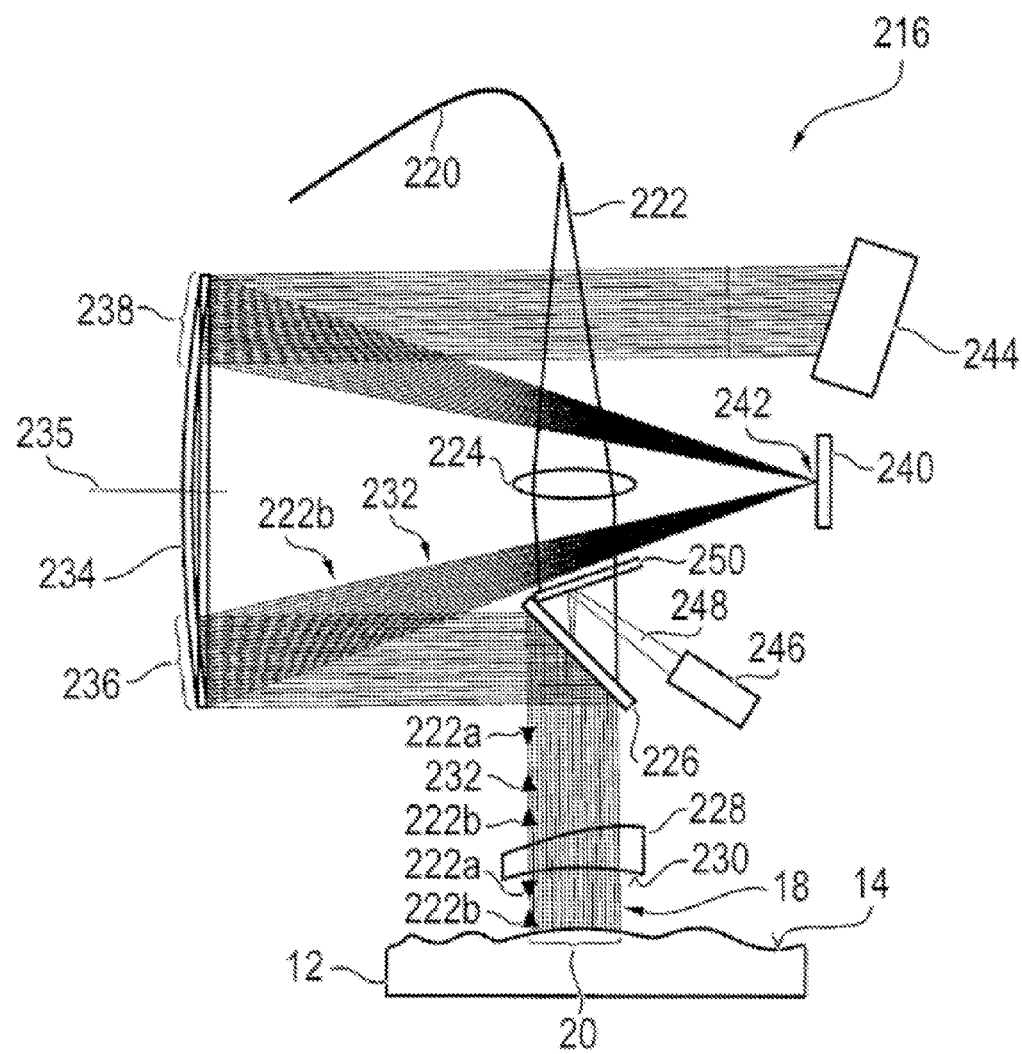
FIG. 5 illustrates a first embodiment the interferometric measuring device included in the measuring apparatus according to the embodiment of FIG. 1 or the embodiment of FIG. 3, wherein the optical path of the interferometric measuring device is illustrated in FIG. 5 in form of parallel rays.

FIG. 5 shows a first embodiment 216 of the interferometric measuring device 16. The measuring device 216 comprises an optical fiber 220 for delivering measurement light 222 generated by a light source not shown in the figure. The light source may for example be a helium neon laser, emitting coherent light at a wavelength of 632.8 nm. Alternatively, also coherent light of different wavelength may be used as measurement light 222.

The measurement light 222 emerges from the fiber 220 as a diverging beam, is collimated by a collimator 224 and traverses subsequently a first beam splitter 250 and a second beam splitter 226. Subsequently the measurement light 222 propagates in form of a plane wave of incoming measurement light 222a towards the optical surface 14 of the test object 12. The wavefront of the incoming measuring light 222a may also have the shape of the best fitting sphere of the target shape of region 20.

The propagation direction of the incoming measurement light 222a and the test object 12 are aligned to each other such that the single rays of the incoming measurement light 222a impinge onto the respective region 20 of the optical surface 14 under test on average perpendicularly to the optical surface 14 or at least close to perpendicularly. Alternatively, the alignment may be such that a central section of the region 20 is illuminated perpendicularly by the incoming measurement light 222a.

Before impinging onto the optical surface 14 the incoming measurement light 222a enters a Fizeau element 228 having a Fizeau surface 230. A portion of the incoming measurement light 222a is reflected as reference light 232 by the Fizeau surface 230. The remaining incoming measurement light 222a is reflected at the respective region 20 of the optical surface 14 and is thereafter referred to as reflected measurement light 222b.

As can be seen from the Fizeau element 228 the interferometric measuring device 216 is provided in form of a Fizeau-type-interferometer. Also a Twyman-Green-type interferometer, a Michelson-type interferometer, a Mach-Zehnder-type interferometer, a point diffraction type interferometer and any other suitable type of interferometer may be used instead.

The reflected measurement light 222b and the reference light 232 are reflected with a portion of their intensity by the beam splitter 226 and travel through imaging optics in form of mirror optics configured to image in the region 20 of the optical surface 14 onto a detection surface of a detection apparatus 244. The detection apparatus 244 is provided in form of a camera, which is tilted about 20° to 30° with respect to the wavefront of the incident light.

The reference light 232 and the reflected measurement light 222b generate an interference pattern on the detection surface of the detection apparatus 244. Several interference patterns are evaluated to determine the shape of the optical surface 40 in the area of the tested region 20. The determined shape is compared to the known target shape of the optical surface 14 to determine the deviation of the actual shape from the target shape and thereby determine the actual shape of the optical surface.

The mirror optics for imaging the optical surface 14 onto the detection apparatus 244 comprises a curved mirror in form of a large parabolic mirror 234 and a plane tilted mirror 240. The parabolic mirror 234 and the mirror 240 are arranged such that the reflected measurement light 222b hits the parabolic mirror 234 at two symmetrically arranged portions with respect the axis 235 of the parabolic mirror 234. The symmetrically arranged portions are hereinafter referred to as first wavefront forming surface 236 and second wavefront forming surface 238. After reflection at the first wavefront forming surface 236 the light 222b is reflected by the plane tilted mirror 240 onto the second wavefront forming surface 238. The plane tilted mirror 240 is thereby arranged at an intermediate focus point 242 and may be equipped with a pinhole. In one embodiment the plane mirror 240 is mounted rotatably. During the interferometric measurement the mirror 240 is rotated in order to average out effects in the measurement which are due to deviations of the plane mirror from the plane shape.

The symmetric utilisation of the parabolic mirror 234 has a coma compensating effect and allows to image a large field onto the detection apparatus 244. Therefore the regions 20 on the optical surface 14 can be chosen large in size. The coma compensating effect of the symmetrical utilisation of the parabolic mirror 234 in this context refers to coma, which is generated, if the test object 12 and/or the Fizeau element 228 are not aligned optimally, so that the reflected measurement light 222b and/or the reference light 232 do not propagate parallel to the axis 235 of the parabolic mirror 234 before impinging onto the first wavefront forming surface 236. Therefore, the symmetric utilisation of the parabolic mirror allows a more robust shape measurement in the regard, that a drift in the alignment of the test object 12 or the Fizeau element 228 does not influence the accuracy of the measurement to a large extent.

The interferometric measuring device 216 further comprises a distance sensor 246 which generates distance measuring laser light 248 directed onto the optical surface 14 of the test object 12 using the beam splitter 250. The distance sensor 246 is used to align the test object 12 with respect to the measuring device 216 before conducting the interferometric measurement.

Figure 6:
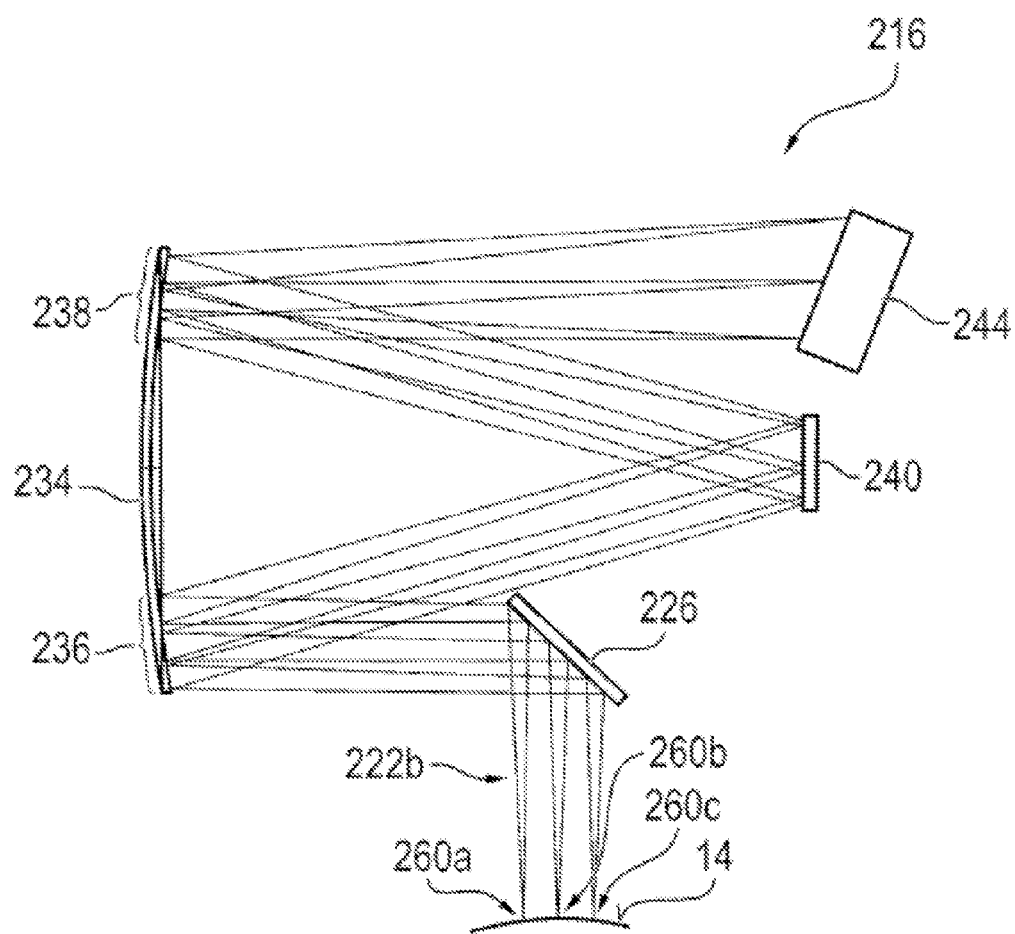
FIG. 6 illustrates the optical path of the interferometric measuring device of FIG. 4 in form of rays which form an image of the optical surface 14.

FIG. 5 shows the optical path of the interferometric measuring device 216 in form of parallel rays. Such a parallel rays are present if the optical surface 14 of the test object is without surface unevenness. In this case, 100% of light travels in parallel rays. FIG. 6 shows the optical path of the interferometric measuring device 216 in form of rays imaging the surface 14 onto the detection apparatus 244, illustrated by exemplary surface points 260a, 260b and 260c imaged in this path.

In reality the optical path is a mixture of the parallel path of rays shown in FIG. 5 and the imaging path of rays shown in FIG. 6. The symmetric utilisation of the parabolic mirror 234 has the above described coma compensating effect both on the parallel path of rays and the imaging path of rays. The optics of the measuring apparatus 216 images the optical surface 14 onto the detection apparatus 244 with a 1:1 imaging ratio, i.e., without magnification.

Figure 7:
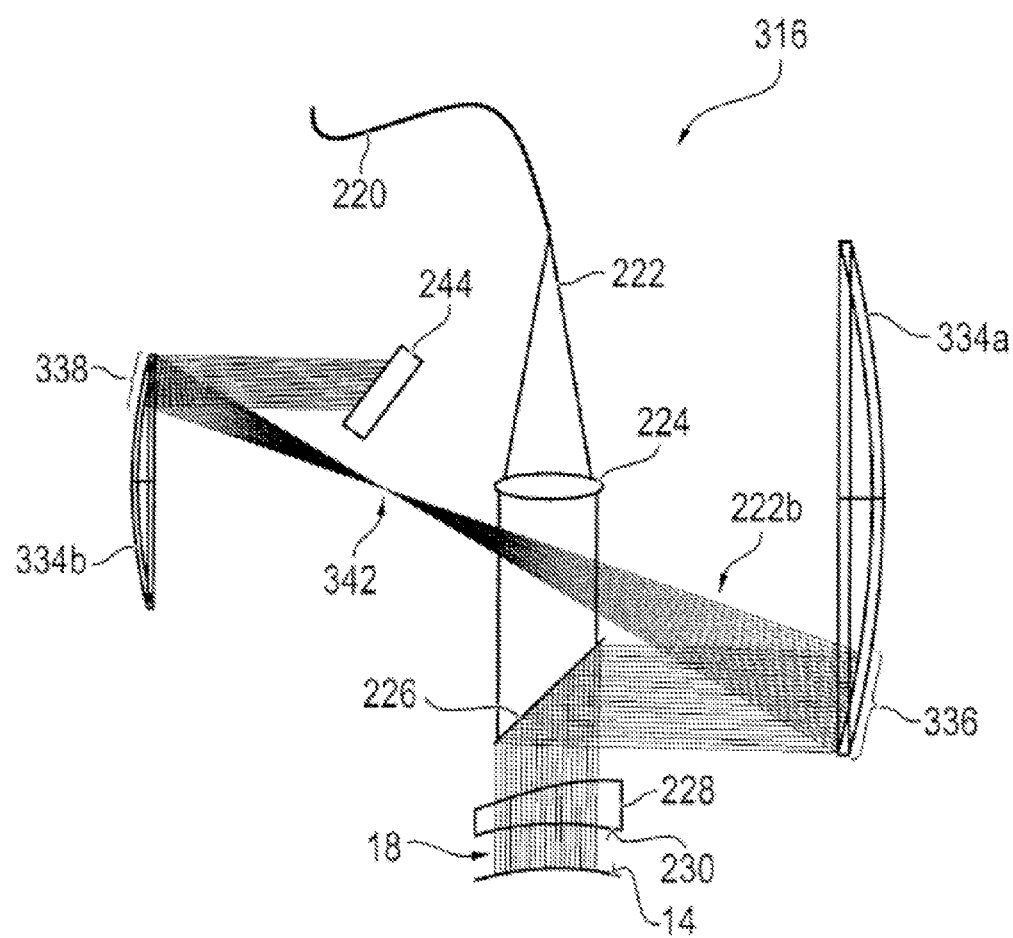
FIG. 7 illustrates the interferometric measurement device in a second embodiment according to the invention.

FIG. 7 shows a second embodiment 316 of the interferometric measuring device 16. In this and the following embodiments elements identical or similar to the measuring device 216 shown in FIG. 4 are designated with the same reference numerals and are not explicitly referred to again. The measuring device 316 comprises imaging optics having an imaging ratio of 1:2 and therefore also a focal distance ratio of 1:2.

The measuring device 316 comprises two parabolic mirrors, a larger first parabolic mirror 334a and a smaller second parabolic mirror 334b, facing each other. The reflected measuring light 222b first impinges onto a first wavefront forming surface 336 at an off-centered section of the first parabolic mirror 334a, converges to an intermediate focus point 342 and is subsequently reflected at a second wavefront forming surface 338 in form of an off-centered section of the second parabolic mirror 334b. The two parabolic mirrors 334a and 334b are located on opposite sides of the intermediate focus point 342.

Figure 8:
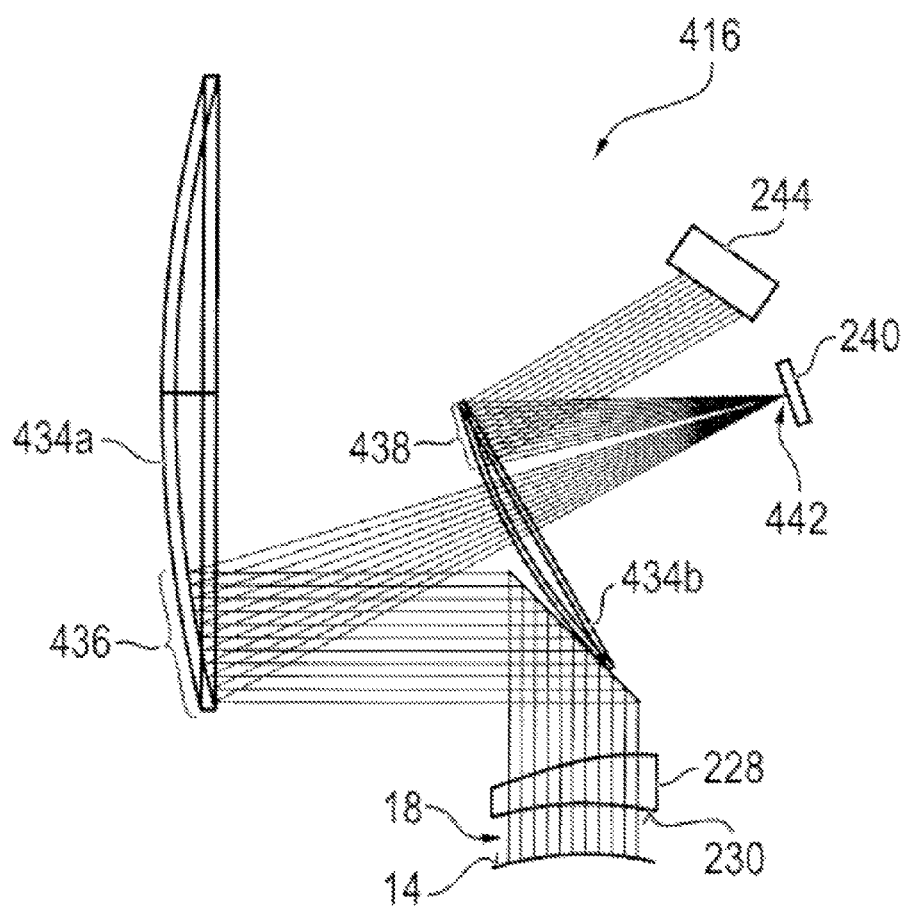
FIG. 8 illustrates the interferometric measurement device in a third embodiment according to the invention.

FIG. 8 shows a third embodiment 416 of the interferometric measuring device 16 also comprising two parabolic mirrors, a first parabolic mirror 434a arranged on the side of the test surface 14 and a second parabolic mirror 434b arranged on the side of the detection apparatus 244. The parabolic mirrors 434a and 434b have different focal lengths and a plane tilted mirror 240 is arranged at an intermediate focus point 442. The parabolic mirrors 434a and 434b are arranged on the same side of the focus point 442. The geometry of the arrangement is optimized by rotating the second parabolic mirror 434b around the focus point 442. Off-centered sections of the parabolic mirrors 434a and 434b form respective wavefront forming surfaces 436 and 438.

Figure 9:
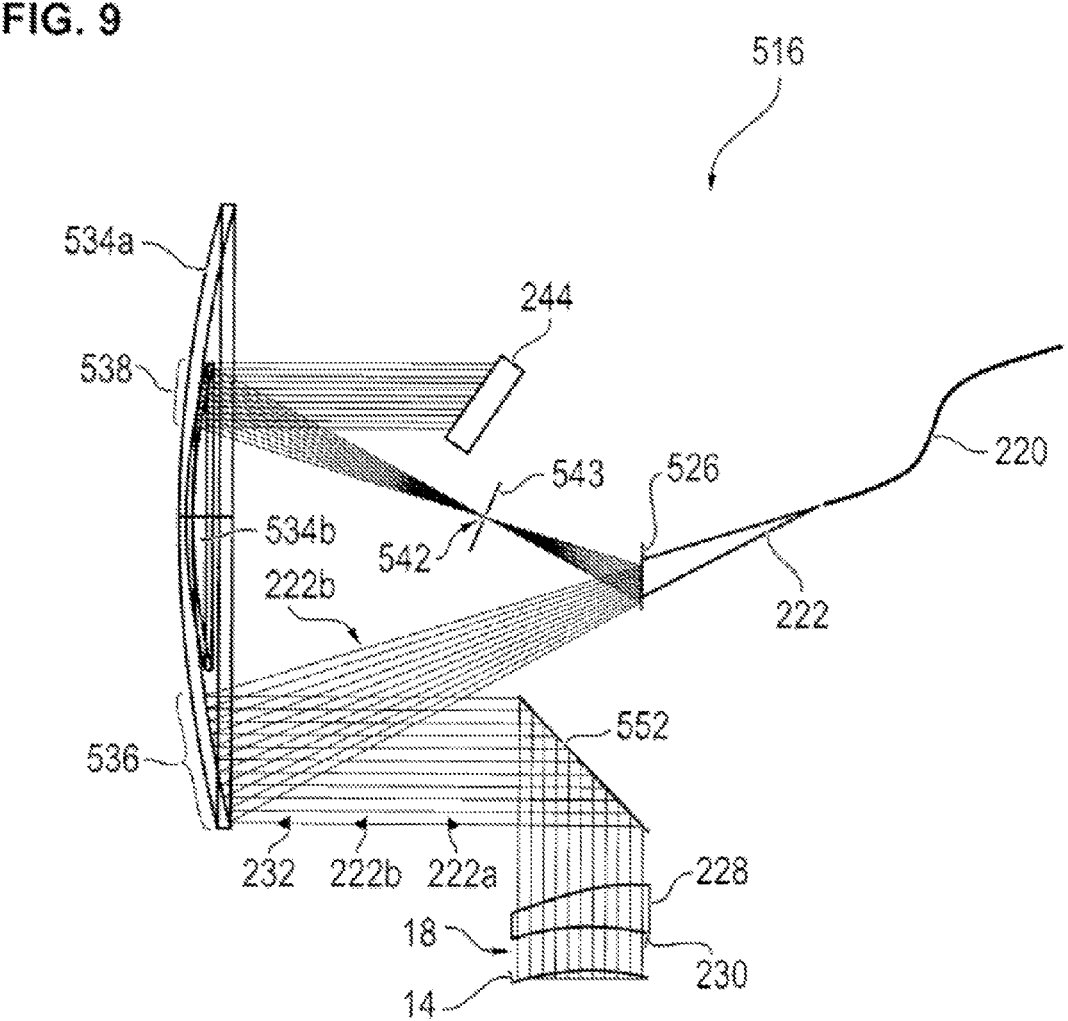
FIG. 9 illustrates the interferometric measurement device in a fourth embodiment according to the invention.

FIG. 9 illustrates a fourth embodiment 516 of the interferometric measuring device 16. Here the measurement light 222 originating from the fiber 220 traverses a beam splitter 526 and subsequently travels via a first parabolic mirror 534a of the imaging optics and a plane mirror 552 before impinging onto the optical surface 14 of the test object 12.

The beam splitter 526 reflects the measurement light 222b coming from the first parabolic mirror 534a towards a second parabolic mirror 534b. The focus point 542 between the parabolic mirrors is located between the beam splitter 526 and the second parabolic mirror 534b, which is smaller than the first parabolic mirror 534a. A pinhole plate 543 is arranged at the focus point 542.

The two parabolic mirrors 534a and 534b point towards the same direction, wherein the second parabolic mirror 534b covers part of the first parabolic mirror 534a with respect of light travelling towards the first parabolic mirror 534a in direction of the axis 535 of the first parabolic mirror 534a, wherein a section of the first parabolic mirror 534a forming a first wavefront forming surface 536 remains uncovered by the second parabolic mirror 534b. An off-centered section of the second parabolic mirror 534b forms a second wavefront forming surface 538 for reflection of the measurement light 222b.

Instead of parabolic mirrors also spherical mirrors may be used for the interferometric measurement devices shown in FIGS. 5 to 9. Further, aspherical mirrors may be used, which have a shape which is not purely parabolic for example for reducing the tilt of the measuring apparatus 244.

The positioning apparatus 22 according to FIG. 1 and the positioning apparatus 122 according to FIG. 4 may be equipped with one or more further measuring heads in addition to the measurement device 16. Such a further measurement head can for example be a roughness sensor, for example an AFM measurement head, which would be able to measure the roughness in a small area of typically 1 μm×1 μm up to 10 μm×10 μm. Alternatively, combined measurement devices, which can perform several measurement functions simultaneously, for example shape and roughness measurements may be used.

Figure 10:
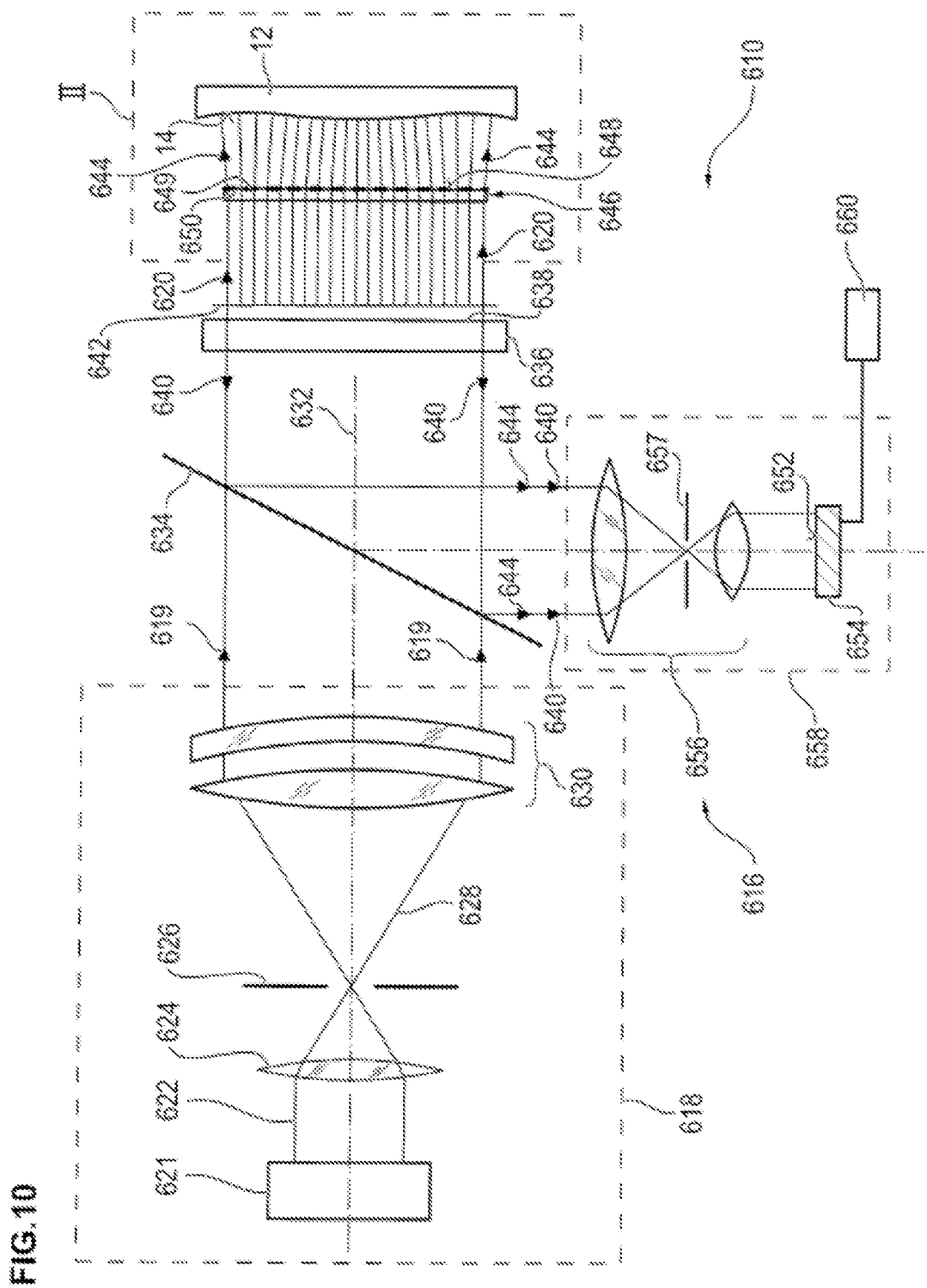
FIG. 10 illustrates a further measuring apparatus for measuring a shape of an optical surface of a test object using a wave shaping element calibrated using a calibration method according to the invention.

FIG. 10 illustrates a further measuring apparatus 610 used for interferometrically measuring a deviation of an actual shape from a target shape of the optical test surface 14 of the test object 12. The test object 12 is mounted on a test piece holder not shown in the drawing. The measuring apparatus 610 comprises in contrast to the measuring device 216 according to FIG. 5 a wave shaping element 646 comprising a diffractive wave shaping structure 649, like a computer generated hologram (CGH), configured to adapt the wave front of a test wave to a target shape of the optical surface 14 of the test object 12. The measuring apparatus 610 will be described in detail in the following. In order to achieve a highly precise measurement of the shape of the optical surface 14, the wave shaping element 646 is calibrated according to the invention before using the wave shaping element in the measuring apparatus 610. The calibration method according to the invention is illustrated later on with reference to FIGS. 11 to 13.

In the first instance the operation of measuring apparatus 610 of measuring the shape of the optical surface 14 using the calibrated wave shaping element 646 is described. The measuring apparatus 610 comprises an interferometer 616, which interferometer 616 comprises a light source unit 618, a beam splitter 634 as well as an interferometer camera 658. The light source unit 618 comprises a laser 621, for example a helium neon laser, emitting a laser beam 622 of coherent light at a wavelength of 632.8 nm. The laser beam 622 is focused by a focusing lens 624 onto a pinhole aperture of a spatial filter 626 such that a diverging beam 628 of coherent light emerges from the pinhole. The wavefront of the diverging beam 28 is in the shown embodiment substantially spherical.

The diverging beam 628 is collimated by a group of lens elements 630 to form an illumination beam 619 having a substantially plane wavefront. The illumination beam 619 travels along an optical axis 632 of the interferometer 616 and traverses the beam splitter 634.

The interferometer 616 illustrated in FIG. 10 is a Fizeau-type interferometer. It is to be noted, however, that the invention is not limited to such an interferometer. Any other type of interferometer, such as a Twyman-Green-type interferometer, a Michelson-type interferometer, a Mach-Zehnder-type interferometer, a point-diffraction-type interferometer and any other suitable type of interferometer may be used.

The illumination beam 619 enters a Fizeau element 636 having a Fizeau surface 638. A portion of the light of the illumination beam 619 is reflected as a reference wave 640 by the Fizeau surface 638. The light of the illumination beam 620 traversing the Fizeau element 636 has a plane wavefront 642 and is in the following designated as incoming wave 620 with respect to the wave shaping element 646 in the form of a diffractive optical element arranged in its beam path.

Optionally, pre-shaping optics transforming the light of the illumination beam 619 having traversed the Fizeau element 636 can be arranged in the beam path for providing the incoming wave 620 with a spherical wavefront. In the example shown in FIG. 10, however, the incoming light wave 620 is a plane wave. The wave shaping element 646 comprises a diffractive surface 648, which diffractive surface 648 comprises the diffractive wave shaping structure 649.

The diffractive wave shaping structure 649 is a hologram, which may be generated by exposing a photographic plate with reference light and light reflected from an optical surface having a surface corresponding to the target shape of the optical test surface 12, or the hologram may be a computer generated hologram (CGH) generated by calculating a corresponding grating using a computer involving methods such as ray tracing and plotting the calculated grating on a surface of a substrate 650. The grating may, for example, be formed by a lithographic method.

The incoming wave 620 is diffracted at the diffractive surface 648 of the wave shaping element 646. The diffracted wave resulting therefrom is referred to as adapted wave 644, which has a wavefront adapted to a target shape of the optical test surface 14. The adapted wave 644 is therefore incident on the optical test surface 14 in auto collimation, on which it is reflected. The wavefront of the reflected adapted wave 644 contains information on the deviation of the actual shape of the optical test surface 12 from its target shape. In an alternative embodiment the adapted wave 644 traverses the optical test surface 14 and is reflected by a subsequent mirror.

As further shown in FIG. 10 the adapted wave 644 having interacted with the optical test surface 14 travels back essentially in the beam path of the incoming wave 620, traverses the Fizeau element 636, and a portion of the reflected adapted wave 644 is reflected by the beam splitter 634. The adapted wave 644 reflected by the beam splitter 634 is imaged onto a photosensitive surface 652 of a camera chip 654 through an objective lens system 656 of the camera 658 including an interferometer stop 657 such that the optical test surface 14 is imaged onto the camera chip 654.

A portion of the reference wave 640 is also reflected by the beam splitter 634 onto the photosensitive surface 652 of the camera chip 654. The reference wave 640 and the reflected adapted wave 644 generate an interference pattern on the photosensitive surface 652. The wave generated by superposition of the reference wave 640 and the adapted wave 644 is referred to as residual wave which generates the interference pattern. The interferometric measuring apparatus 610 further comprises an evaluation device 660 which is adapted for determining the deviation distribution of the actual shape from the target shape of the optical test surface 14 based on the measured interference pattern.

Figure 11:
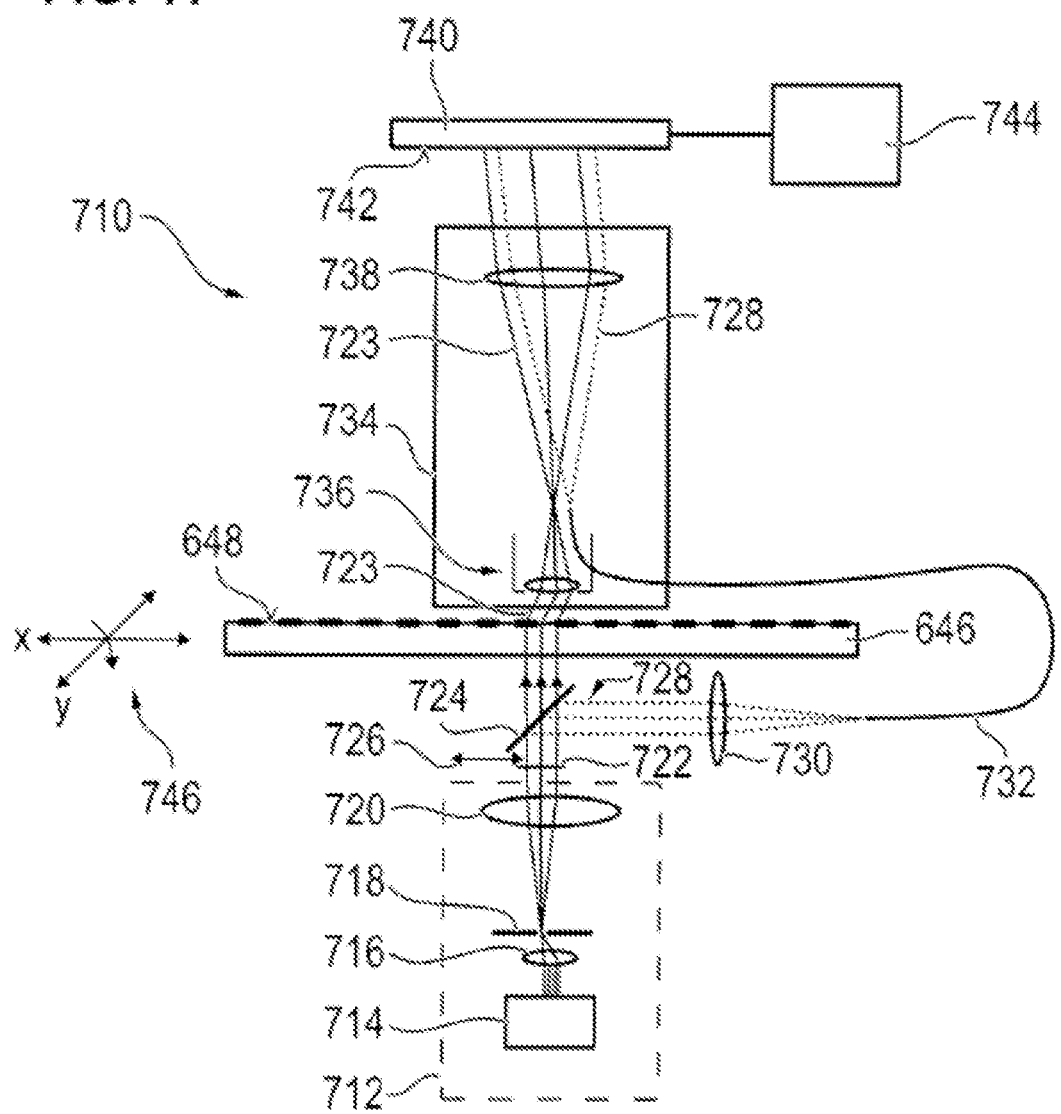
FIG. 11 illustrates a first embodiment of the qualification apparatus for conducting the calibration method according to the invention for calibrating the wave shaping element used by the measuring apparatus according to FIG. 10.

FIG. 11 shows a qualification apparatus 710 in an embodiment according to the invention for calibrating the wave shaping element 646 used in the measuring apparatus 610 according to FIG. 10. As mentioned above, the wave shaping element 646 has a wave shaping surface in form of a diffractive surface 648 comprising a diffractive wave shaping structure 649, e.g. in the form of a computer generated hologram. In the measuring apparatus 610 the diffractive surface 648 performs the function of adapting the wave front of the incoming wave 620 to the target shape of the optical test surface 14. Therefore the diffractive surface has a target wave shaping effect, namely the effect to adapt the wave front of the incoming wave 620 precisely to the target shape of the optical test surface 14.

FIG. 10 is meant to illustrate the general concept of a measuring apparatus comprising a diffractive wave shaping element. The calibration method according to the invention described below may be used to calibrate a diffractive wave shaping element used in the measuring apparatus 610 according to FIG. 10 or in other variations of such measuring apparatuses. Advantageously the diffractive element 48 contained in the measuring apparatus shown in FIG. 1 of US 2009/0128829 A1, which document is hereby incorporated in its entirety by reference, is calibrated using the calibration method according to the present invention.

By the calibration method according to the invention deviations of the actual wave shaping effect of the diffractive surface 648 from the target wave shaping effect are determined as described in the following. This deviation information is taken into consideration by the evaluation device 660 of the measuring apparatus 610 when determining the actual shape of the optical test surface 14 based on the measured interference pattern.

As shown in FIG. 11 the qualification apparatus 710 comprises an illumination unit 712 for generating a measurement wave 722. According to an embodiment the measurement wave 722 is configured with the same wavefront as the incoming wave 620 of the measuring apparatus 610. In this case the measurement wave 722 is a plane wave. The illumination unit 712 comprises a laser, such as a helium neon laser, emitting laser light at a wavelength of 632.8 nm. The laser light is focused by a focusing lens 716 onto a pinhole of a spatial filter 718 such that a diverging beam of coherent light emerges from the pinhole. The diverging beam is collimated by a collimator 720 to form the measurement wave 722.

A portion of the light of the measurement wave 722 is split off by a beam splitter 724 to form a reference wave 728, which is coupled into an optical fiber 732 by a collimating lens 730. The light of the measurement wave 722 passing through the beam splitter 724 traverses the wave shaping element 646 having a wave shaping surface in form of the diffractive surface 648. The lateral extension of the measurement wave 722 is limited such that the light of the measurement wave 772 irradiates only a region of the diffractive surface 648. The region irradiated by the measurement wave 772 may e.g. be a square of 1 mm×1 mm size, wherein the total area of the diffractive surface 648 may have a diameter of 200 mm.

After transmission through the wave shaping element 646 the wavefront of the measurement wave 722 is modified due to the wave shaping effect of the diffractive surface 648. In analogy to the adapted wave 646 in the measuring apparatus 610 the measurement wave 722 after transmission through the wave shaping element 646 is herein after referred to as adapted measurement wave 723. The adapted measurement wave 732 subsequently enters magnifying imaging optics 734 configured to image the illuminated region of the diffractive surface 648 onto a detection surface 742 of a detection camera 740 in magnified scale. The magnification in the illustrated case is $\beta=-10$. The imaging optics 734 are configured such that the shape of wavefront of the adapted measurement wave 723 is conserved when traversing the imaging optics 734.

The magnifying imaging optics 734 are configured as so-called 4f-imaging optics known to the person skilled in the art. Regarding the configuration and function of 4f-imaging optics reference is made to Freimann & Gross, "Propagation of the phase distribution through double telecentric optical systems", Optik 105, Volume 105, No. 2 (1997), pages 69-73.

The magnifying imaging optics 734 according to FIG. 11 comprises a microscope objective 736 and a lens or a group of lenses 738 of positive refractive power. The end of the optical fiber 732 is arranged inside the imaging optics 734 such that the reference wave 728 forms an interferogram with the adapted measuring wave 723 on the detection surface 742 of the detection camera 740. During operation of the qualification apparatus 710 the beam splitter 724 is moved back and forth as indicated by the double arrow 726 in order to cause phase shifting. Interferograms are recorded for different phase settings and therefrom the shape of the wavefront of the adapted wave 723 is determined by an evaluation device 744. This wavefront represents the wave shaping effect of the illuminated region of the diffractive surface 648.

Subsequently, the wave shaping element 646 is shifted laterally with respect to the propagation direction of the measurement wave 722 such that a second region of the diffractive surface 648 is illuminated by the measurement wave 722, wherein the first region and the second region have an overlapping section. The above described wavefront measurement is repeated for the second region. Subsequently the wave shaping element 646 is shifted step by step laterally as indicated by the double arrows 746 such that the entire diffractive surface 648 is illuminated consecutively in overlapping regions. For each of the illuminated regions the respective wavefront is measured. This region-by-region measurement of the wave shaping element 646 can also be referred to as sub-aperture measurement.

Subsequently, the wavefronts measured for the respective regions are computationally combined by the evaluation device 744. This is done by fitting the sections of the measured wavefronts corresponding to the overlapping sections of the respective illuminated regions of the diffractive surface 648 to each other. This computational combining can also be referred to as stitching.

The deviations of the wave shaping effect of the diffractive surface 648 from the target wave shaping effect are determined from the stitched wavefront by the evaluation device 744. This is done by comparing the measured wavefront with the wavefront expected for the given diffractive surface 648. The expected wavefront can be calculated from the design of the diffractive surface 648 which defines its target wave shaping effect.

Typically the deviations of the wave shaping effect of the diffractive surface 648 from the target wave shaping effect have a significantly higher frequency than the variations of the target wave front with respect to a plane wave, which can be described by the classical Zernike polynomials. These deviations are subsequently also referred to as mid-spatial-frequency deviations. In one embodiment according to the invention the mid-spatial-frequency deviations are determined by mathematically fitting the Zernike polynomials to the measured stitched wavefront and subtracting the fitted wavefront from the measured stitched wavefront. For this operation it is sufficient to consider only the Zernike polynomials Z1 to Z36. The result of this subtraction represents the deviation of the wave shaping effect of the diffractive surface 648 from the target wave shaping effect.

Figure 12:
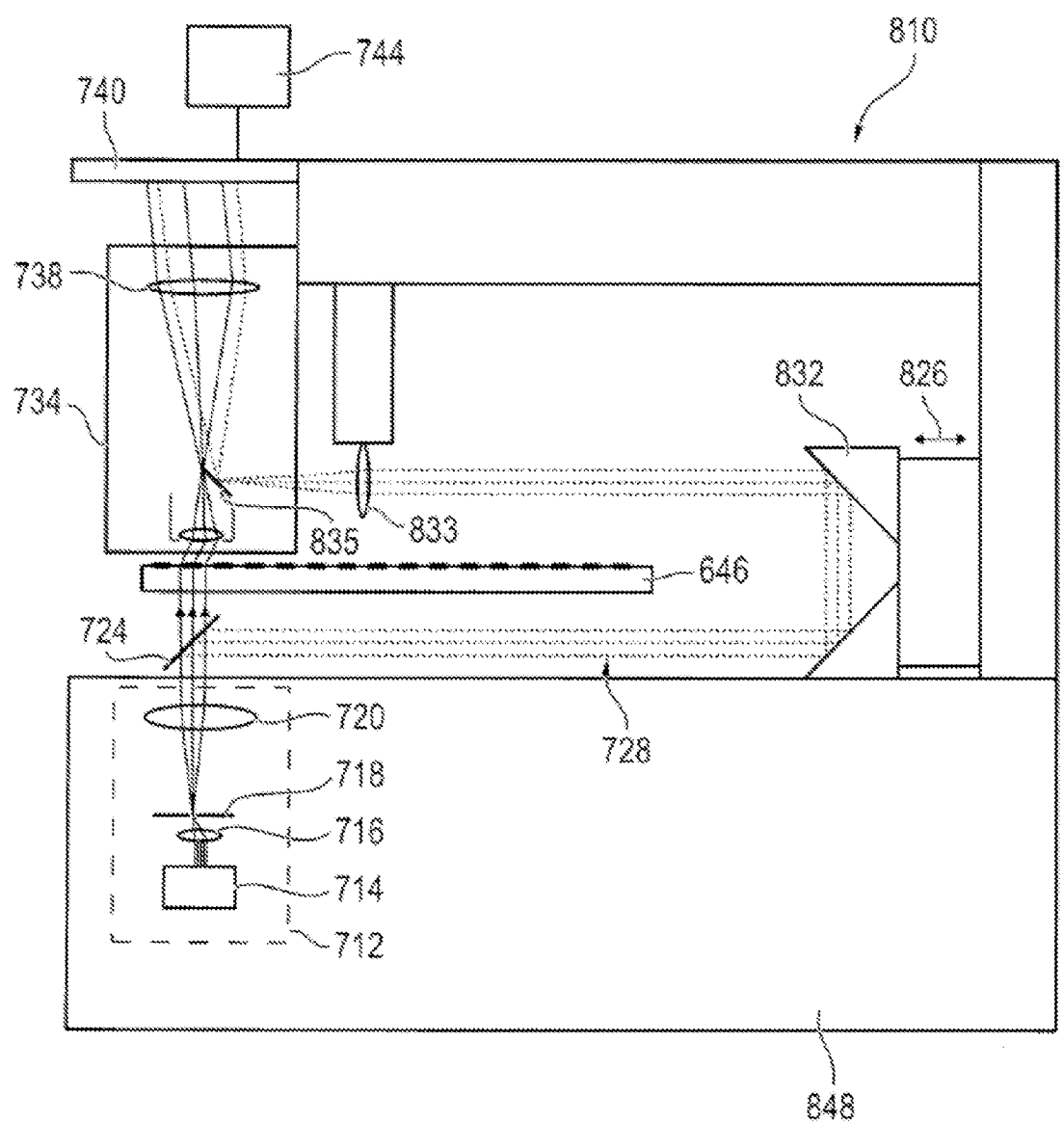
FIG. 12 illustrates a second embodiment of a qualification apparatus for conducting the calibration method according to the invention.

FIG. 12 shows the qualification apparatus according to the invention in a further embodiment 810. This embodiment differs from the embodiment 710 shown in FIG. 11 only in the details referred to in the following. Instead of a fiber for guiding the reference wave 728 into the magnifying imaging optics 734, the qualification apparatus 810 comprises a corner cube 832 for guiding the reference wave 728 around the wave shaping element 646.

Subsequently the reference wave 728 is collimated by a collimator 833 and superimposed with the adapted measurement wave 723 using a reflector plate 835. The corner cube 832 is moved back and forth in the direction of the incoming reference wave 728, as indicated by the double arrow 826, in order to obtain interferograms at different phases. In the qualification apparatus 810 the illumination unit 712 and a detection unit comprising the imaging optics 734 and the detection camera 740 are connected to each other by a rigid frame 848.

Figure 13:
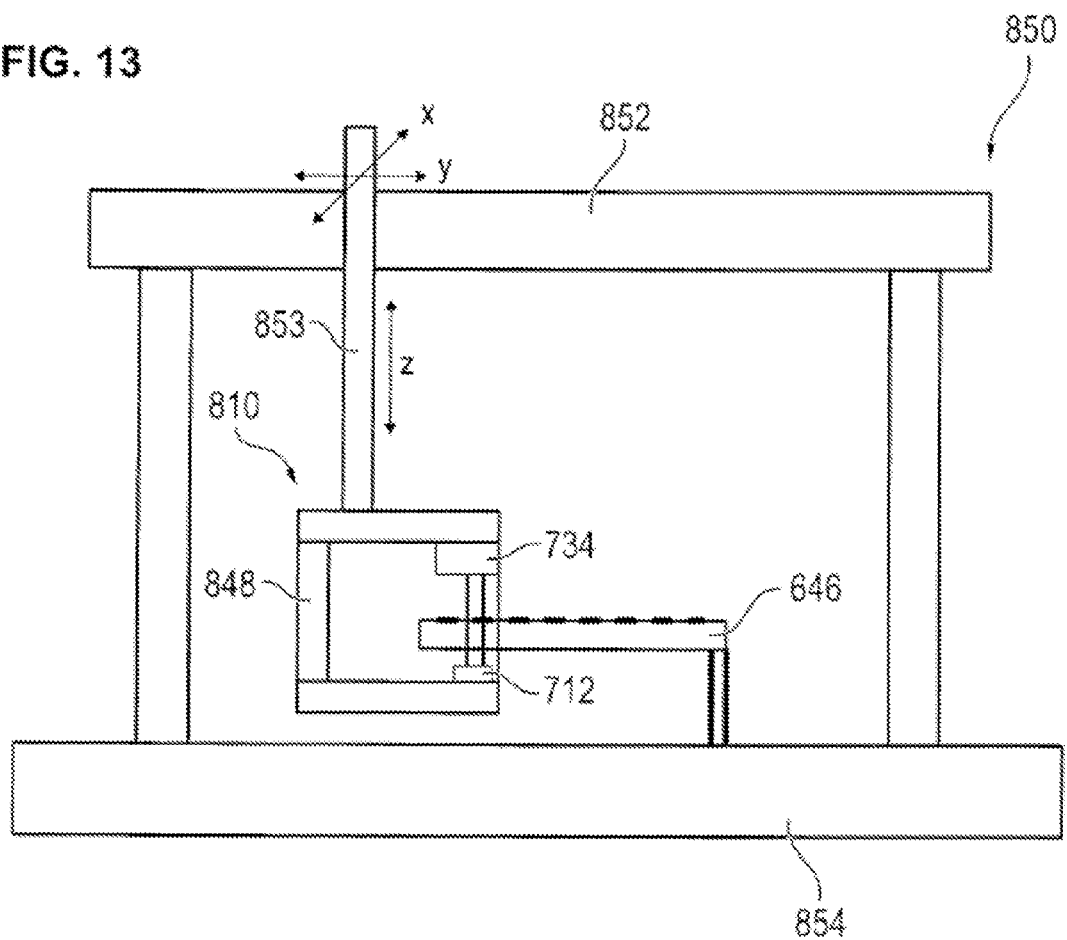
FIG. 13 illustrates a positioning apparatus for positioning the qualification apparatus according to FIG. 11 or FIG. 12 relative to the test object.

FIG. 13 illustrates a positioning apparatus 850 for positioning the qualification apparatus 810 in three orthogonal translation dimensions x, y and z. In this configuration the illumination unit 712 and the detection unit are shifted between the sub-aperture measurements while the wave shaping element 646 remains static. As positioning apparatus 850 a coordinate measuring machine is used having a table 854 holding the wave shaping element 646 and a portal 852 carrying a positioning arm 853 holding the qualification apparatus 810.

In order to separate the mid-spatial-frequency deviations of the wave shape forming CGH-effect from the deviations of the optics of the illumination unit 712 and the imaging optics 734, the measured mid-spatial-frequency deviations are averaged. Advantageously additionally the wave shaping element 646 is measured under different rotation angles, in order to improve the averaging. For this purpose the wave shaping element 646 is mounted such that it can be tilted with respect to the incoming measurement wave 722, as indicated by the double arrows 746 of FIG. 11.

All invariant wave front components are attributed to the qualification apparatus 710 or 810, the variable components to the wave shaping element 646. The averaged measurement results contain substantially the mid-spatial-frequency deviations of the qualification apparatus 710 or 810. Those can be subtracted from all single measurements afterwards, such that the mid-spatial-frequency deviations of the wave shaping element 646 are known in absolute terms.

In a further embodiment only the imaging optics 734 are rotated and the single measurement results are averaged. The resulting average value contains substantially rotationally symmetric deviations of the imaging optics 734. Mid-spatial-frequency deviations of the imaging optics 734 are largely averaged out. A subtraction of this average value from a single value results in the mid-spatial-frequency deviations of the imaging optics 734 in absolute terms. This way the mid-spatial-frequency deviations are known and can be considered in further measurements. An analogue procedure may be employed with respect to the illumination unit 712.

According to an embodiment of the qualification method according to the invention the qualification measurement is performed twice, wherein the wave shaping element 646 is rotated by 180° between the two measurements. This way one measurement is based on an adapted measurement wave 723 generated in a positive diffraction order, e.g. the +1. diffraction order, of the measurement wave 722 on the diffractive structures 649 of the wave shaping element 646 under test. The second measurement is based on an adapted measurement wave 723 generated in a negative diffraction order, e.g. the −1. diffraction order, of the measurement wave 722 on the diffractive structures 649 of the wave shaping element 646 under test.

Figure 14:
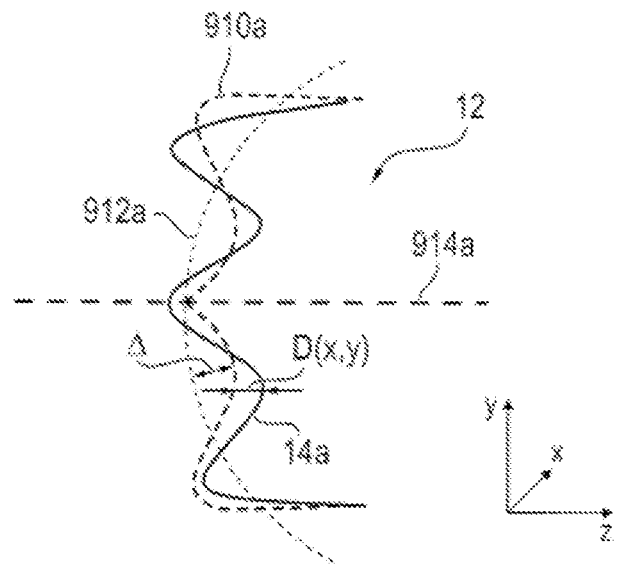
FIG. 14 depicts a cross-sectional view of a first embodiment of an optical element according to the invention having a rotationally symmetric aspherical surface.

FIG. 14 shows a cross sectional view of a first embodiment 14a of an optical surface of an optical element 12 manufactured according to the invention in the form of a convex mirror. The optical surface 14a is adapted to a non-spherical target shape 910a, which is configured in form of a rotationally symmetric asphere. The target shape 910a is rotationally symmetric with respect to a rotational axis of symmetry 914a, which typically also acts as a rotational axis of symmetry for a best fitting spherical surface 912a of the target shape 910a. The target shape 910a has a deviation Δ from its best fitting spherical surface 912a of at least 500 μm. That means the target shape 910a deviates from its best fitting spherical surface 912a at at least one location of the target shape 910a by at least 500 μm.

The target shape 910a may be represented by the following formula, which is known to the person skilled in the art as "asphere-equation":

$$z = \frac{cr^2}{1+\sqrt{1-(1+k)c^2r^2}} + \alpha_1 r^2 + \alpha_2 r^4 + \alpha_4 r^8 + \alpha_5 r^{10} + \alpha_6 r^{12} + \alpha_8 r^{14}$$

In this equation z represents the z-coordinate of the surface of the target shape 910a at a distance r from the optical axis or axis of symmetry 914a, c is the curvature of the aspherical surface, k is the conic coefficient, and $\alpha_i$ are further coefficients. An exemplary embodiment of the target shape 910a is characterized by the following parameters for the above equation:
R=+668.5512 mm
c=1/r=1.49577·10$^{-3}$ mm$^{-1}$
k=0
$\alpha_1$=0
$\alpha_2$=−2.946315·10$^{-9}$ mm$^{-3}$
$\alpha_3$=8.333468·10$^{-14}$ mm$^{-5}$
$\alpha_4$=1.08029510·10$^{-17}$ mm$^{-7}$ Another example of an aspherical surface is contained in WO 2006/077145 A2 which document is hereby incorporated by reference.

Figure 15:
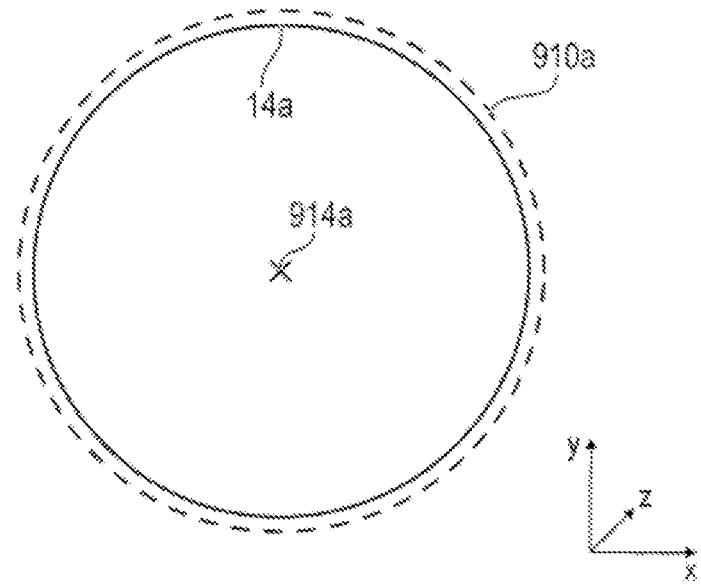
FIG. 15 depicts a topdown view of the optical element shown in FIG. 14.
Figure 16:
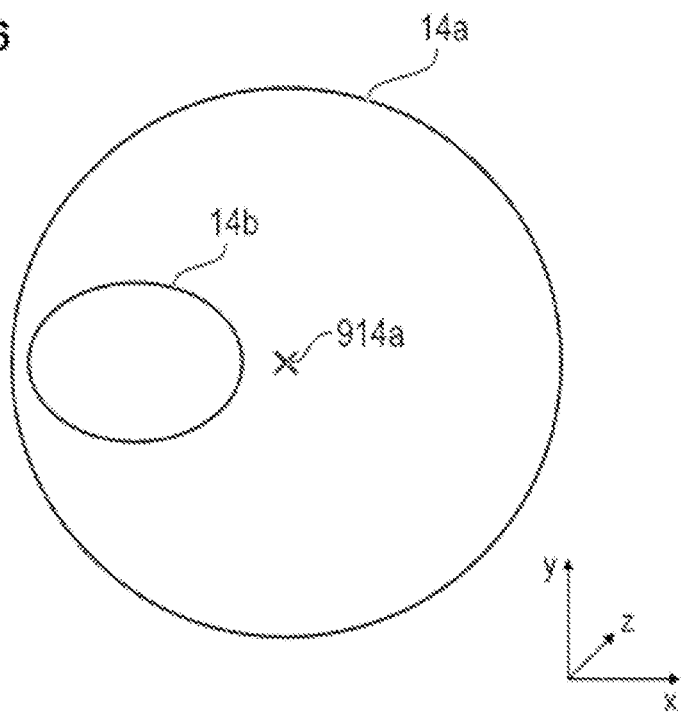
FIG. 16 illustrates a second embodiment of an optical element according to the invention in the form of an off-axis asphere in topdown view.

FIG. 15 shows a topdown view of the optical surface 14a according to FIG. 14 together with a perimeter of the target shape 910a. FIG. 16 illustrates a second embodiment 14b of an optical surface of an optical element 12 manufactured according to the invention. The optical surface 14b is a so-called "off-axis asphere" and is configured as an off-centered section of a rotationally symmetric aspherical surface. As an example for a rotationally symmetric aspherical surface the perimeter of the optical surface 14a of FIG. 15 is depicted in FIG. 16 for illustration purposes. The optical surface 14b is an off-centered area of the optical surface 14a. The target shape of the optical surface 14b, not shown in the drawings, also has a deviation from its best fitting spherical surface of at least 500 μm.

Figure 17:
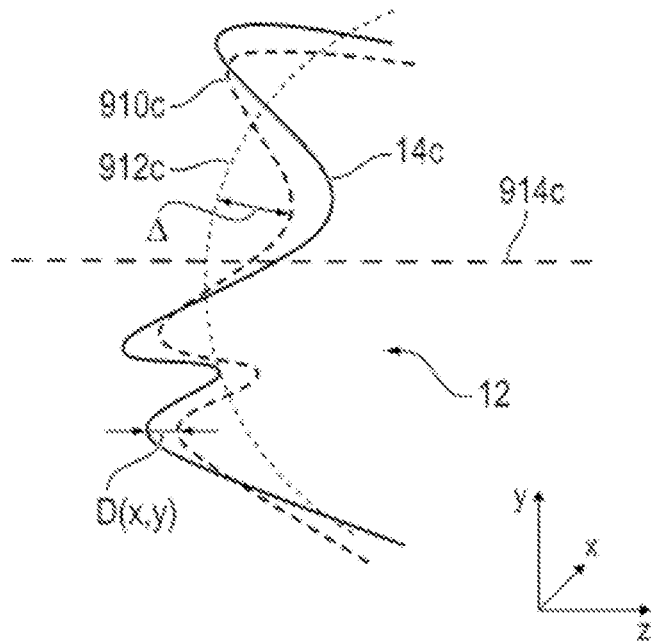
FIG. 17 depicts a cross-sectional view of a third embodiment of an optical element according to the invention having a free form surface.

FIG. 17 shows a cross sectional view of a third embodiment 14c of an optical surface of an optical element 12 manufactured according to the invention. The optical surface 14c is a so-called free form surface adapted to a target shape 910c of no rotational symmetry. FIG. 17 further shows the best fitting spherical surface 912c of the target shape 910c. For illustrative purposes the rotational axis 914c of the best fitting spherical surface 912c is shown in the drawing. The optical surface 14c has a deviation Δ from its best fitting spherical surface 912 of at least 5 μm.

The target shape 910c may be represented by different mathematical functions, for example splines or simple xy-polynomials in the following form:

$$z = \sum_{n,m} a_{nm} x^n y^m$$

wherein z is the arrow height and n+m≤10 or ≤20. Such representations are supported by many optical design programs like Code V known to the person skilled in the art.

According to the invention an optical element 12, which can be of any of the types shown in FIGS. 14 to 17, is provided. This optical element 12 has an optical surface 14, which is adapted to the respective non-spherical target shape 910, such that variations of the actual shape of the optical surface with respect to the target shape having a spatial wavelength between 0.015 mm and 2 mm according to one embodiment and a spatial wavelength between 0.015 mm and 30 mm according to another embodiment are limited to at most 100 pm RMS, in particular 50 pm RMS.

The optical element 12 can for example be manufactured using the measuring method and the measuring apparatus according to the present invention in any of the embodiments illustrated above. The measuring apparatus is used to determine portions of the optical element to be further processed during the manufacture of the optical element such that the above specifications are met.

As mentioned above, the optical element 12 according to the invention is characterized by variations of the actual shape of its optical surface 14 with respect to the target shape 910 within the above spatial wavelength range being limited to a maximum value of 100 pm RMS, in particular 50 pm RMS.

The variations of the actual shape of the optical surface 14 with respect to the target shape 910 are defined as follows: a deviation D(x, y) of the actual shape from the target shape is determined as a function of location (x, y) on the optical surface 14. The deviation D(x,y) at a given location (x$_0$, y$_0$) is transferred from the spatial domain into the frequency domain by performing a Fourier transform resulting in the function d(v), wherein v is the frequency.

The minimum spatial wavelength $\lambda_{min}$ and the maximum spatial wavelength $\lambda_{max}$ which are 0.015 mm and 2 mm in one embodiment according to the invention, are converted into a maximum frequency $v_{max}$ and a minimum frequency $v_{min}$ in the frequency domain. Subsequently the maximum amplitude of the function d(v) in the frequency region between the maximum frequency $v_{max}$ and the minimum frequency $v_{min}$ is determined. This amplitude value reflects the maximum amplitude at the location (x$_0$, y$_0$) of the optical surface 14 and is therefore referred to as local amplitude A$_l$. Subsequently local amplitudes A$_l$ are determined for a number of locations on the optical surface 14.

For qualifying the optical element 12 according to the invention the long wave variations of the actual shape 14 from the target 910 shape within the above spatial wavelength range are defined by the RMS (root mean square) value of a number of local amplitudes A$_l$, especially the RMS of the local amplitudes A$_l$ at any location on the optical surface.

The present invention has been described by way of exemplary embodiments to which it is not limited. Variations and modifications will occur to those skilled in the art without departing from the scope of the present invention. Applicant seeks to cover the full scope of the present invention, as recited in the appended claims and including equivalents thereof.

The invention claimed is:

1. A method of measuring an actual shape of an optical surface of a test object, comprising:
    providing an areal interferometric measuring device generating a measurement wave,
    arranging the interferometric measuring device and the test object consecutively at different measurement positions relative to each other, such that different two-dimensional regions of the optical surface are illuminated by the measurement wave,
    measuring the positional coordinates of the interferometric measuring device at the different measurement positions in relation to the test object,
    obtaining surface region measurements by interferometrically measuring the wavefront of the measurement wave after interaction with the respective region of the optical surface using the measuring device in each of the measurement positions, and
    determining the actual shape of the optical surface by computationally combining the surface region measurements based on the measured positional coordinates of the interferometric measuring device at each of the measurement positions, wherein said computationally combining comprises a fitting of shapes obtained from the surface region measurements to each other.

2. The method according to claim 1,
    wherein the regions of the optical surface illuminated at the different measurement positions overlap in sections with each other and the surface region measurements are computationally combined by fitting the overlapping sections of the surface region measurements to each other, and correcting results of the fitting based on the measured positional coordinates of the measuring device.

3. The method according to claim 1,
    wherein the interferometric measuring device is positioned relative to the test object using a coordinate measuring machine.

4. The method according to claim 1,
    wherein a positioning apparatus positions the interferometric measuring device relative to the test object in order to arrange the measuring device in the different measurement positions, which positioning apparatus is configured to tilt the measuring device with respect to at least one axis.

5. The method according to claim 1,
    wherein a positioning apparatus positions the interferometric measuring device relative to the test object, in order to arrange the measuring device in the different measurement positions, and said method further comprises measuring further properties of the optical surface by a further measurement device, which is also positioned relative to the test object by the positioning apparatus.

6. The method according to claim 1,
    wherein the interferometric measuring device comprises: a detection apparatus configured to record an interferogram, and imaging optics comprising at least one curved mirror and configured to image the optical test surface onto the detection apparatus.

7. A method of measuring an actual shape of an optical surface of a test object, comprising:
    providing an interferometric measuring device generating a measurement wave
    arranging the interferometric measuring device and the test object consecutively at different measurement positions relative to each other, such that different regions of the optical surface are illuminated by the measurement wave,
    measuring the positional coordinates of the interferometric measuring device in relation to the test object at the measurement positions by directing three distance measuring laser interferometers onto at least one retro-reflector attached to the measuring device, wherein the retro-reflector has a convex reflection surface,
    obtaining surface region measurements by interferometrically measuring the wavefront of the measurement wave after interaction with the respective region of the optical surface using the measuring device in each of the measurement positions, and
    determining the actual shape of the optical surface by computationally combining the surface region measurements based on the measured positional coordinates of the interferometric measuring device at each of the measurement positions.

8. The method according to claim 7,
    wherein each of the distance measuring laser interferometers is mounted to tilt with respect to two tilt axes.

9. The method according to claim 7,
    wherein at least three retro-reflectors are attached to the interferometric measuring device and each measuring laser interferometer is directed at a different retro-reflector.

10. The method according to claim 7, wherein the three distance measuring laser interferometers are directed onto a single retro-reflector attached to the measuring device.

11. The method according to claim 7,
    wherein the interferometric measuring device is positioned relative to the test object using a coordinate measuring machine.

12. The method according to claim 7,
    wherein a positioning apparatus positions the interferometric measuring device relative to the test object, in order to arrange the measuring device in the different measurement positions, and said method further comprises measuring further properties of the optical surface by a further measurement device, which is also positioned relative to the test object by the positioning apparatus.

13. A method of measuring an actual shape of an optical surface of a test object, comprising:
    providing an interferometric measuring device generating a measurement wave,
    arranging the interferometric measuring device and the test object consecutively at different measurement positions relative to each other, such that different regions of the optical surface are illuminated by the measurement wave,
    measuring positional coordinates of the interferometric measuring device at the different measurement positions in relation to the test object using four distance measuring laser interferometers, wherein distances to at least one retro-reflector attached to the measuring device are measured by each of the four laser interferometers and distances between at least three of the four laser interferometers are determined mathematically therefrom, obtaining surface region measurements by interferometrically measuring the wavefront of the measurement wave after interaction with the respective region of the optical surface using the measuring device in each of the measurement positions, and determining the actual shape of the optical surface by computationally combining the surface region measurements based on the measured positional coordinates of the interferometric measuring device at each of the measurement positions.

* * * * *

UNITED STATES PATENT AND TRADEMARK OFFICE
CERTIFICATE OF CORRECTION

| | | |
|---|---|---|
| PATENT NO. | : 8,593,642 B2 | Page 1 of 1 |
| APPLICATION NO. | : 13/417487 | |
| DATED | : November 26, 2013 | |
| INVENTOR(S) | : Rolf Freimann et al. | |

It is certified that error appears in the above-identified patent and that said Letters Patent is hereby corrected as shown below:

In the Specifications

Column 10, Line 46: delete "the a" and insert -- the --

Column 14, Line 25: delete "Φ" and insert -- ϕ --

Column 17, Line 47: delete "inter-ferometric" and insert -- interferometric --

In the Claims

Column 28, Line 4: In Claim 7, delete "wave" and insert -- wave, --

Signed and Sealed this
Twenty-ninth Day of April, 2014

Michelle K. Lee
*Deputy Director of the United States Patent and Trademark Office*